United States Patent
Takahashi et al.

(10) Patent No.: US 6,320,014 B1
(45) Date of Patent: *Nov. 20, 2001

(54) POLYESTER PELLETS

(75) Inventors: Koji Takahashi; Koji Nakamachi; Hiroji Niimi; Shoji Hiraoka; Masayuki Sakai; Hitoshi Tsuboi, all of Waki-cho (JP)

(73) Assignee: Mitsui Chemicals INC, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/256,088

(22) Filed: Feb. 24, 1999

(30) Foreign Application Priority Data

Feb. 25, 1998 (JP) .................................................. 10-043461
Jul. 14, 1998 (JP) .................................................. 10-199353

(51) Int. Cl.$^7$ .................................................. C08G 63/18
(52) U.S. Cl. .................. 528/194; 528/308; 528/308.1; 528/308.3; 528/308.6; 528/308.8
(58) Field of Search .................................. 528/272, 194, 528/308, 308.1, 308.3, 308.6, 308.8

(56) References Cited

U.S. PATENT DOCUMENTS

| | | |
|---|---|---|
| 4,578,295 | 3/1986 | Jabarin . |
| 5,006,613 | 4/1991 | Shepherd et al. . |
| 5,115,047 * | 5/1992 | Hashimoto et al. .................. 525/444 |
| 5,556,675 * | 9/1996 | Yamamoto et al. ............... 428/36.92 |
| 5,686,553 * | 11/1997 | Tai et al. ............................... 528/194 |
| 5,902,539 | 5/1999 | Schmidt et al. . |

FOREIGN PATENT DOCUMENTS

| | | |
|---|---|---|
| 0171161 | 2/1986 | (EP) . |
| 174265 | 3/1986 | (EP) . |
| 415728 | 8/1990 | (EP) . |
| 415728 | 3/1991 | (EP) . |
| 822213 | 2/1998 | (EP) . |
| 2188052A | 9/1987 | (GB) . |
| 61-072051 | 4/1986 | (JP) . |
| 01-198323 | 11/1989 | (JP) . |
| 02-063716 | 3/1990 | (JP) . |
| 2-274757 | 11/1990 | (JP) . |
| 354249 | 3/1991 | (JP) . |
| 387233 | 4/1991 | (JP) . |
| 8-034910 | 2/1996 | (JP) . |
| 9-124785 | 5/1997 | (JP) . |

* cited by examiner

*Primary Examiner*—Leo B. Tentoni

(57) ABSTRACT

Disclosed are polyester pellets made of a polyester which comprises dicarboxylic acid constituent units derived from dicarboxylic acids containing terephthalic acid and isophthalic acid and diol constituent units derived from diols containing ethylene glycol and 1,3-bis(2-hydroxyethoxy) benzene, and which has the properties: constituent units derived from terephthalic acid are 15 to 99.5% by mol and constituent units derived from isophthalic acid are 0.5 to 85% by mol, both based on the total amount of dicarboxylic acid isophthalic acid constituent units (i); constituent units derived from ethylene glycol are 25 to 99.5% by mol and constituent units derived from 1,3-bis(2-hydroxyethoxy) benzene are 0.5 to 75% by mol, both based on the total amount of the diol constituent units (ii); the intrinsic viscosity is in the range of 0.5 to 1.5 dl/g; and the melting point (Tm (°C.)), as measured by a differential scanning calorimeter, satisfies the formula $[1/527-0.0017 \cdot \ln(1-(m_I + m_B)/200)]^{-1} - 273 < Tm \leq 265$; said polyester pellets having a density of not less than 1,350 kg/m$^3$. Also disclosed is a process for preparing the polyester pellets. The polyester pellets are excellent in gas barrier properties, transparency and heat resistance and hardly generate acetaldehyde.

7 Claims, No Drawings

POLYESTER PELLETS

FIELD OF THE INVENTION

The present invention relates to novel polyester pellets and a process for preparing the polyester pellets. More particularly, the invention relates to polyester pellets having excellent gas barrier properties, transparency and heat resistance and to a process for preparing the polyester pellets.

BACKGROUND OF THE INVENTION

Because of their excellent gas barrier properties, transparency and mechanical strength, saturated polyesters such as polyethylene terephthalate are widely used for containers such as bottles. Particularly, the bottles obtained by biaxial stretching blow molding (draw blow molding) of polyethylene terephthalate are excellent in transparency, mechanical strength, heat resistance and gas barrier properties, so that they have been extensively used as containers (PET bottles) to be filled with drinks such as juice, soft drinks and carbonated beverages.

Such bottles are generally produced by a process comprising molding a saturated polyester into a preform having a neck part and a body part, inserting the preform in a mold of given shape, and subjecting the preform to stretching blow molding to stretch the body part, thereby producing a bottle having a neck part and an oriented body part.

The polyester bottles, particularly polyester bottles for drinks such as juice, are required to have heat resistance high enough for heat sterilization of the contents therein, and therefore the bottles are generally further subjected to heat treatment (heat setting) after the blow molding to improve the heat resistance.

In the polyester bottles obtained by the above process, the neck parts are unstretched and inferior to the stretched body parts in the mechanical strength and the heat resistance. In general, therefore, the neck parts of the preforms are heated to crystallize prior to the blow molding, or the necks of the bottles obtained by blow molding are heated to crystallize, thereby improving the neck parts in the mechanical strength and the heat resistance.

In recent years, the sizes of bottles produced from the polyester resins (particularly polyethylene terephthalate) tend to be made smaller. In case of such small-sized bottles, the contact area between the contents and the bottle body part per unit volume is increased, and thus loss of gas or permeation of oxygen from the outside may have a marked influence on the contents, resulting in decrease of shelf life of the contents. Accordingly, the polyester resins are required to have more excellent gas barrier properties than before.

In order to improve the heat resistance and the gas barrier properties of the polyester resins, an attempt to blend polyethylene terephthalate with polyethylene isophthalate has been proposed (see Japanese Patent Publication No. 22302/1989). The blend of polyethylene terephthalate and polyethylene isophthalate, however, generates acetaldehyde when it is melt kneaded at a high temperature to improve compatibility, and this causes problems such as change of taste of the contents filled in the container and lowering of transparency. Further, the polyethylene isophthalate adheres to the screw to prolong the residence time, and this causes another problem of scorching. Furthermore, when polyethylene isophthalate is amorphous, polyethylene terephthalate is required to be dried by an ordinary drier, then cooled and blended in a dry state with the polyethylene isophthalate, followed by molding the blend. Therefore, the cost of equipment for various steps from drying to molding is great, and much space is necessary for the equipment.

To cope with the above problems, there has been proposed a polyester comprising ethylene glycol and a dicarboxylic acid component which comprises terephthalic acid as a major ingredient and isophthalic acid. This polyester, however, does not always have sufficient heat resistance and gas barrier properties and sometimes generates acetaldehyde. Accordingly, development of polyesters having further improved heat resistance and gas barrier properties and hardly generating acetaldehyde is desired.

OBJECT OF THE INVENTION

The present invention has been made with a view to solving such problems in the prior art as mentioned above, and it is an object of the invention to provide crystallized polyester pellets having excellent gas barrier properties, transparency and heat resistance and hardly generating acetaldehyde and to provide a process for preparing the polyester pellets.

SUMMARY OF THE INVENTION

The novel polyester pellets according to the invention are polyester pellets made of a polyester which comprises dicarboxylic acid constituent units derived from dicarboxylic acids containing terephthalic acid and isophthalic acid and diol constituent units derived from diols containing ethylene glycol and 1,3-bis(2-hydroxyethoxy)benzene, and which has the following properties:

constituent units derived from terephthalic acid are 15 to 99.5% by mol and constituent units derived from isophthalic acid are 0.5 to 85% by mol, both based on the total amount of the dicarboxylic acid constituent units (i), constituent units derived from ethylene glycol are 25 to 99.5% by mol and constituent units derived from 1,3-bis(2-hydroxyethoxy)benzene are 0.5 to 75% by mol, both based on the total amount of the diol constituent units (ii), the intrinsic viscosity is in the range of 0.5 to 1.5 dl/g, and the melting point (Tm (° C.)), as measured by a differential scanning calorimeter, satisfies the following formula (I):

$$[1/527-0.0017 \cdot \ln(1-(m_I+m_B)/200)]^{-1}-273 < Tm \leq 265 \quad (I)$$

wherein $m_I$ is a proportion (% by mol) of the constituent units derived from isophthalic acid to all of the dicarboxylic acid constituent units, and $m_B$ is a proportion (% by mol) of the constituent units derived from 1,3-bis(2-hydroxyethoxy)benzene to all of the diol constituent units;

said polyester pellets having a density of not less than 1,350 kg/m³.

The melting point (Tm (° C.)) of the polyester desirably satisfies the following formula (I'):

$$[1/527-0.0017 \cdot \ln(1-(m_I+m_B)/200)]^{-1}-270 < Tm \leq 265 \quad (I').$$

The acetaldehyde content in the polyester pellets is preferably not more than 20 ppm, particularly preferably not more than 10 ppm.

The process for preparing polyester pellets according to the invention comprises blending (A) polyethylene terephthalate before solid phase polymerization having an intrinsic viscosity of 0.3 to 0.8 dl/g, in an amount of 99 to 20% by weight, with (B) a polyethylene isophthalate copolymer before solid phase polymerization having an intrinsic viscosity of 0.3 to 0.9 dl/g, in an amount of 1 to 80% by weight, said polyethylene isophthalate copolymer comprising dicarboxylic acid constituent units derived from dicarboxylic acids containing terephthalic acid and isophthalic acid and diol constituent units derived from diols containing ethylene glycol and 1,3-bis(2-hydroxyethoxy)benzene, pelletizing the blend, and crystallizing the pellets.

It is preferable that the blend is heated to precrystallize it and then subjected to solid phase polymerization.

The blend preferably has a heat-up crystallizing temperature of not higher than 190° C.

Another process for preparing polyester pellets according to the invention comprises blending (C) polyethylene terephthalate after solid phase polymerization having an intrinsic viscosity of 0.5 to 1.5 dl/g, in an amount of 99 to 20% by weight, with (B) a polyethylene isophthalate copolymer before solid phase polymerization having an intrinsic viscosity of 0.3 to 0.9 dl/g, in an amount of 1 to 80% by weight, said polyethylene isophthalate copolymer comprising dicarboxylic acid constituent units derived from dicarboxylic acids containing terephthalic acid and isophthalic acid and diol constituent units derived from diols containing ethylene glycol and 1,3-bis(2-hydroxyethoxy)benzene, pelletizing the blend, and crystallizing the pellets.

In the present invention, the blend may be subjected to solid phase polymerization after the crystallization.

In any of the above-described processes for preparing polyester pellets according to the invention, the polyethylene isophthalate copolymer (B) preferably has the following properties:

constituent units derived from isophthalic acid to all of the dicarboxylic acid are 50 to 98% by mol and constituent units derived from terephthalic acid are 2 to 50% by mol, both based on the total amount of dicarboxylic acid constituent units (i), and constituent units derived from ethylene glycol are 15 to 99% by mol and constituent units derived from 1,3-bis(2-hydroxyethoxy)benzene are 1 to 85% by mol, both based on the total amount of diol constituent units (ii).

DETAILED DESCRIPTION OF THE INVENTION

The polyester pellets according to the invention and the process for preparing the polyester pellets are described in detail hereinafter.

Novel Polyester Pellets

The polyester pellets of the invention are made of a polyester which comprises dicarboxylic acid constituent units derived from dicarboxylic acids containing terephthalic acid and isophthalic acid and diol constituent units derived from diols containing ethylene glycol and 1,3-bis (2-hydroxyethoxy)benzene.

It is desirable that the dicarboxylic acid constituent units comprise constituent units derived from terephthalic acid in amounts of 15 to 99.5% by mol, preferably 50 to 99% by mol, and constituent units derived from isophthalic acid in amounts of 0.5 to 85% by mol, preferably 1 to 50% by mol, both based on the total amount of dicarboxylic acid constituent units.

The polyester may contain constituent units derived from dicarboxylic acids other than the isophthalic acid and the terephthalic acid in amounts of less than 20% by mol, within limits not prejudicial to the object of the invention.

Examples of other dicarboxylic acids which may be contained in amounts of less than 20% by mol include:

aromatic dicarboxylic acids, such as phthalic acid (orthophthalic acid), 2,6-naphthalenedicarboxylic acid, 2,7-naphthalenedicarboxylic acid, 2,5-naphthalenedicarboxylic acid, diphenyldicarboxylic acid and diphenoxyethanedicarboxylic acid;

aliphatic dicarboxylic acids, such as succinic acid, glutaric acid, adipic acid, sebacic acid, azelaic acid and decanedicarboxylic acid; and alicyclic dicarboxylic acids, such as cyclohexanedicarboxylic acid.

Also employable are ester derivatives of these dicarboxylic acids, and these dicarboxylic acids or their ester derivatives can be used in combination of two or more kinds.

It is desirable that the diol constituent units comprise constituent units derived from ethylene glycol in amounts of 25 to 99.5% by mol, preferably 35 to 99.5 % by mol, more preferably 50 to 99.5% by mol, and constituent units derived from 1,3-bis(2-hydroxyethoxy)benzene in amounts of 0.5 to 75% by mol, preferably 0.5 to 65% by mol, more preferably 0.5 to 50 % by mol, both based on the total amount of diol constituent units.

The polyester may contain constituent units derived from diols other than the ethylene glycol and the 1,3-bis(2-hydroxyethoxy)benzene in amounts of less than 15% by mol, within limits not prejudicial to the object of the invention.

Examples of other diols which may be contained in amounts of less than 15% by mol include:

aliphatic glycols, such as diethylene glycol, triethylene glycol, tetraethylene glycol, trimethylene glycol, propylene glycol, butanediol, pentanediol, neopentyl glycol, hexamethylene glycol and dodecamethylene glycol;

alicyclic glycols, such as cyclohexanedimethanol;

glycols containing aromatic groups, such as 1,2-bis(2-hydroxyethoxy)benzene and 1,4-(2-hydroxyethoxy)benzene; and aromatic diols, such as bisphenols, hydroquinone and 2,2-bis(4-β-hydroxyethoxyphenyl)propane.

Also employable are ester derivatives of these diols, and these diols or their ester derivatives can be used in combination of two or more kinds.

Of these diols, preferable is diethylene glycol.

The polyester may further contain units derived from polyfunctional carboxylic acids having 3 or more carboxyl groups and polyhydric alcohols having 3 or more hydroxyl groups within limits not prejudicial to the object of the invention. Specifically, the units derived from the polyfunctional carboxylic acids and/or the units derived from the polyhydric alcohols may be contained in amounts of 0.01 to 5% by mol, preferably 0.05 to 3% by mol, more preferably 0.1 to 1.5% by mol, independently, based on 100% by mol of the dicarboxylic acid units.

It is desirable that the polyester for forming the pellets of the invention has an intrinsic viscosity ($\eta$), as measured in o-chlorophenol at 25° C., of 0.50 to 1.5 dl/g, preferably 0.60 to 1.5 dl/g, more preferably 0.7 to 0.9 dl/g.

The melting point (Tm (° C.)) of the polyester, as measured by a differential scanning calorimeter, satisfies the following formula (I):

$$[1/527-0.0017 \cdot \ln(1-(m_I+m_B)/200)]^{-1} - 273 < Tm \leq 265 \quad (I)$$

wherein $m_I$ is a proportion (% by mol) of the constituent units derived from isophthalic acid to all of the dicarboxylic acid constituent units, and $m_B$ is a proportion (% by mol) of the constituent units derived from 1,3-bis(2-hydroxyethoxy)benzene to all of the diol constituent units.

It is preferable that the melting point (Tm (° C.)) satisfies the following formula (I'):

$$[1/527-0.0017 \cdot \ln(1-(m_I+m_B)/200)]^{-1} - 270 < Tm \leq 265 \quad (I').$$

In the formulas (I) and (I'), Tm is preferably not higher than 257° C., more preferably not higher than 254° C.

The polyester pellets made of such a polyester have a density of not less than 1,350 kg/m$^3$, preferably not less than 1,355 kg/m$^3$, more preferably not less than 1,360 kg/m$^3$, still more preferably not less than 1,380 kg/M$^3$.

The polyester desirably has a heat-up crystallizing calorific value of usually not less than 5 J/g, preferably 7 to 40 J/g.

The polyester pellets of the invention desirably have an acetaldehyde content of not more than 20 ppm, particularly not more than 10 ppm.

There is no specific limitation on the size and the shape of the polyester pellets of the invention, and they are determined appropriately to the use application of the pellets. Examples of the pellet shapes include column-like, elliptic cylindrical, spherical and elliptic spherical shapes. Although the pellet size is not specifically limited, the average diameter of the pellets is usually in the range of about 2.0 to 5.0 mm.

The polyester pellets of the invention can be prepared by the later-described process (1) or (2).

The polyester pellets may optionally contain additives commonly added to polyesters, such as colorants, antioxidants, oxygen absorbents, ultraviolet light absorbers, antistatic agents and flame retardants. In the polyester pellets, recycled PET may be arbitrarily blended. The polyester pellets may furthermore contain resins other than polyesters, such as polyethylene, ionomers, polypropylene and polyester elastomers, if desired.

The polyester pellets of the invention can be used as a material of various molded products such as preforms, bottles, (oriented) films and sheets. These molded products may be laminated ones having at least one layer formed from the polyester pellets of the invention or having at least one layer formed from a blend of the polyester pellets of the invention and another resin. This layer may be any of inner, outer and intermediate layers. Examples of resins for forming other layers include polyesters, such as polyethylene terephthalate and polyethylene isophthalate; polyamides, such as nylon 6; and ethylene/vinyl acetate copolymers. of these, polyethylene terephthalate is particularly preferable.

Bottles produced from the polyester pellets are excellent in gas barrier properties, transparency and heat resistance. Moreover, the bottles hardly generate acetaldehyde, so that the taste of the contents such as juice does not deteriorate.

Next, the process for preparing polyester pellets according to the invention is described.

Process (1) for Preparing Polyester Pellets

The process for preparing polyester pellets according to the invention comprises blending (A) polyethylene terephthalate before solid phase polymerization having an intrinsic viscosity of 0.3 to 0.8 dl/g, in an amount of 99 to 20% by weight, with (B) a polyethylene isophthalate copolymer before solid phase polymerization having an intrinsic viscosity of 0.3 to 0.9 dl/g, in an amount of 1 to 80% by weight, pelletizing the blend, crystallizing the pellets, and preferably further subjecting the pellets to solid phase polymerization.

(A) Polyethylene Terephthalate

The polyethylene terephthalate (A) for use in the invention comprises dicarboxylic acid units derived from terephthalic acid or its ester derivative and diol units derived from ethylene glycol or its ester derivative.

The dicarboxylic acid units in the polyethylene terephthalate (A) contain terephthalic acid units in amounts of not less than 80% by mol, preferably 85 to 100% by mol, based on 100% by mol of the dicarboxylic acid units.

Examples of other dicarboxylic acids which may be contained in amounts of not more than 20% by mol include:

aromatic dicarboxylic acids, such as phthalic acid (orthophthalic acid), isophthalic acid, 2,6-naphthalenedicarboxylic acid, 2,7-naphthalenedicarboxylic acid, 2,5-naphthalenedicarboxylic acid, diphenyldicarboxylic acid and diphenoxyethanedicarboxylic acid;

aliphatic dicarboxylic acids, such as succinic acid, glutaric acid, adipic acid, sebacic acid, azelaic acid and decanedicarboxylic acid; and alicyclic dicarboxylic acids, such as cyclohexanedicarboxylic acid.

Also employable are ester derivatives of these dicarboxylic acids, and these dicarboxylic acids or their ester derivatives can be used in combination of two or more kinds.

Of these dicarboxylic acids, isophthalic acid is preferable.

The diol units of the polyethylene terephthalate (A) desirably contain ethylene glycol units in amounts of not less than 80% by mol, preferably 85 to 100% by mol, based on 100% by mol of the diol units.

Examples of other diols which may be contained in amounts of not more than 20% by mol include:

aliphatic glycols, such as diethylene glycol, triethylene glycol, tetraethylene glycol, trimethylene glycol, propylene glycol, butanediol, pentanediol, neopentyl glycol, hexamethylene glycol and dodecamethylene glycol;

alicyclic glycols, such as cyclohexanedimethanol;

glycols containing aromatic groups, such as 1,2-bis(2-hydroxyethoxy)benzene, 1,3-bis(2-hydroxyethoxy) benzene and 1,4-(2-hydroxyethoxy)benzene; and aromatic diols, such as bisphenols, hydroquinone and 2,2-bis(4-β-hydroxyethoxyphenyl)propane.

Also employable are ester derivatives of these diols, and these diols or their ester derivatives can be used in combination of two or more kinds.

Of these diols, preferable are diethylene glycol and cyclohexanedimethanol.

The polyethylene terephthalate for use in the invention may further contain units derived from polyfunctional carboxylic acids having 3 or more carboxyl groups and polyhydric alcohols having 3 or more hydroxyl groups, within limits not prejudicial to the object of the invention. Examples of polyfunctional carboxylic acids are trimesic acid and pyromellitic anhydride, and examples of polyhydric alcohols are glycerol, 1,1,1-trimethylolethane, 1,1,1-trimethylolpropane, 1,1,1-trimethylolmethane and pentaerythritol.

The polyethylene terephthalate (A) for use in the invention is substantially linear, and this can be confirmed by the fact that the polyethylene terephthalate (A) is dissolved in o-chlorophenol.

The polyethylene terephthalate (A) desirably has an intrinsic viscosity (η), as measured in o-chlorophenol at 25° C., of 0.3 to 0.8 dl/g, preferably 0.35 to 0.75 dl/g, and is a product obtained after liquid phase polymerization and before solid phase polymerization.

It is desirable that the polyethylene terephthalate (A) has a melting point, as measured by a differential scanning calorimeter (DSC, heating rate: 10° C./min), of usually 210 to 265° C., preferably 220 to 260° C., and has a glass transition temperature of usually 50 to 120° C., preferably 60 to 100° C.

The polyethylene terephthalate (A) may be precrystallized, if necessary. The precrystallization can be carried out by heating the polyethylene terephthalate (A) at a temperature of usually 100 to 220° C., preferably 130 to 200° C., for about 1 to 360 minutes.

The polyethylene terephthalate (A) can be prepared by a conventional process. For example, the aforesaid dicarboxylic acid and diol are directly esterified and then melt polycondensed in the presence of a polycondensation catalyst such as a germanium compound (e.g. germanium dioxide), an antimony compound (e.g., antimony trioxide, antimony acetate) or a titanium compound (e.g., titanium tetraalkoxide). In another example to prepare the polyethylene terephthalate (A), an ester of the dicarboxylic acid and the diol are subjected to transesterification in the presence of a transesterification catalyst such as a titanium alkoxide (e.g., titanium tetrabutoxide, titanium isopropoxide) or a metallic salt of acetic acid (e.g., cobalt acetate, zinc acetate, magnesium acetate, manganese acetate, calcium acetate). Preferable transesterification catalysts are titanium tetrabutoxide and zinc acetate. Thereafter, the transesterification product is subjected to melt polycondensed in the presence of a polycondensation catalyst such as a germanium compound (e.g. germanium dioxide), an antimony compound (e.g., antimony trioxide, antimony acetate) or a titanium compound (e.g., titanium tetraalkoxide). The polycondensation catalyst is desirably used in an amount of 0.0005 to 0.1 part by weight, preferably 0.001 to 0.05 part by weight, based on 100 parts by weight of the total of the dicarboxylic acid (or the dicarboxylic ester) and the diol.

(B) Polyethylene Isophthalate Copolymer

The polyethylene isophthalate copolymer (B) for use in the invention comprises dicarboxylic acid constituent units derived from dicarboxylic acids containing terephthalic acid and isophthalic acid and diol constituent units derived from diols containing ethylene glycol and 1,3-bis(2-hydroxyethoxy)benzene.

The dicarboxylic acid constituent units desirably comprise constituent units derived from isophthalic acid in amounts of 50 to 98% by mol, preferably 60 to 95% by mol, and constituent units derived from terephthalic acid in amounts of 2 to 50% by mol, preferably 5 to 40 % by mol, based on the total amount of all of the dicarboxylic acid constituent units.

The polyethylene isophthalate copolymer (B) may further contain constituent units derived from dicarboxylic acids other than the isophthalic acid and the terephthalic acid in amounts of less than 15% by mol, within limits not prejudicial to the object of the invention.

Examples of other dicarboxylic acids which may be contained in amounts of less than 15% by mol include:

aromatic dicarboxylic acids, such as phthalic acid (orthophthalic acid), 2,6-naphthalenedicarboxylic acid, 2,7-naphthalenedicarboxylic acid, 2,5-naphthalenedicarboxylic acid, diphenyldicarboxylic acid and diphenoxyethanedicarboxylic acid;

aliphatic dicarboxylic acids, such as succinic acid, glutaric acid, adipic acid, sebacic acid, azelaic acid and decanedicarboxylic acid; and alicyclic dicarboxylic acids, such as cyclohexanedicarboxylic acid.

Also employable are ester derivatives of these dicarboxylic acids, and these dicarboxylic acids or their ester derivatives can be used in combination of two or more kinds.

The diol constituent units desirably comprise constituent units derived from ethylene glycol in amounts of 15 to 99% by mol, preferably 15 to 90% by mol, more preferably 20 to 88% by mol, and constituent units derived from 1,3-bis(2-hydroxyethoxy)benzene in amounts of 1 to 85% by mol, preferably 10 to 85% by mol, more preferably 12 to 80% by mol, based on the total amount of all of the diol constituent units.

The polyethylene isophthalate copolymer (B) may further contain constituent units derived from diols other than the ethylene glycol and the 1,3-bis(2-hydroxyethoxy)benzene in amounts of less than 15% by mol, within limits not prejudicial to the object of the invention.

Examples of other diols which may be contained in amounts of less than 15% by mol include:

aliphatic glycols, such as diethylene glycol, triethylene glycol, tetraethylene glycol, trimethylene glycol, propylene glycol, butanediol, pentanediol, neopentyl glycol, hexamethylene glycol and dodecamethylene glycol;

alicyclic glycols, such as cyclohexanedimethanol;

glycols containing aromatic groups, such as 1,2-bis(2-hydroxyethoxy)benzene and 1,4-(2-hydroxyethoxy)benzene; and aromatic diols, such as bisphenols, hydroquinone and 2,2-bis(4-β-hydroxyethoxyphenyl)propane.

Also employable are ester derivatives of these diols, and these diols or their ester derivatives can be used in combination of two or more kinds.

Of these diols, preferable is diethylene glycol.

The polyethylene isophthalate copolymer (B) may further contain units derived from such polyfunctional carboxylic acids having 3 or more carboxyl groups and such polyhydric alcohols having 3 or more hydroxyl groups as previously described with respect to the polyethylene terephthalate (A), within limits not prejudicial to the object of the invention. Specifically, the units derived from the polyfunctional carboxylic acids and/or the units derived from the polyhydric alcohols may be contained in amounts of 0.05 to 0.4% by mol, preferably 0.1 to 0.35% by mol, more preferably 0.2 to 0.35% by mol, independently, based on 100% by mol of the dicarboxylic acid units.

The polyethylene isophthalate copolymer (B) desirably has an intrinsic viscosity ($\eta$), as measured in o-chlorophenol at 25° C., of 0.3 to 0.9 dl/g, preferably 0.35 to 0.85 dl/g, and is a product obtained after liquid phase polymerization and before solid phase polymerization.

The polyethylene isophthalate copolymer (B) desirably has a glass transition temperature, as measured by a differential scanning calorimeter (DSC, heating rate: 10° C./min), of usually 40 to 120° C., preferably 50 to 100° C.

The polyethylene isophthalate copolymer (B) may be precrystallized, if necessary, similarly to the polyethylene terephthalate (A).

The polyethylene isophthalate copolymer (B) can be prepared by a conventional process. For example, the aforesaid dicarboxylic acid and diol ate directly esterified and then melt polycondensed in the presence of a polycondensation catalyst such as a germanium compound (e.g. germanium dioxide), an antimony compound (e.g., antimony trioxide, antimony acetate) or a titanium compound (e.g., titanium tetraalkoxide). In another example to prepare the polyethylene isophthalate copolymer (B), an ester of the dicarboxylic acid and the diol are subjected to transesterification in the presence of a transesterification catalyst such as a titanium alkoxide (e.g., titanium tetrabutoxide, titanium isopropoxide) or a metallic salt of acetic acid (e.g., cobalt acetate, zinc acetate, magnesium acetate, manganese acetate, calcium acetate). Preferable transesterification catalysts are titanium tetrabutoxide and zinc acetate. Thereafter, the transesteriffication product is subjected to melt polycondensed in the presence of a polycondensation catalyst such as a germanium compound (e.g. germanium dioxide), an antimony compound (e.g., antimony trioxide, antimony acetate) or a titanium compound (e.g., titanium tetraalkoxide).

Blending of Polyesters

In the process of the invention, 99 to 20% by weight, preferably 99 to 40% by weight, more preferably 98 to 50% by weight, of the polyethylene terephthalate (A) and 1 to 80% by weight, preferably 1 to 60% by weight, more preferably 2 to 50% by weight, of the polyethylene isophthalate copolymer (B) are blended with each other.

The blending is carried out by mixing the polyethylene terephthalate (A) with the polyethylene isophthalate copolymer (B) in the above mixing ratio and melt kneading them at 260 to 310° C. for 2 to 300 seconds. After the kneading, the resulting blend is processed into chips (pellets) by means of an extruder or the like. The average diameter of the pellets is preferably in the range of 2.0 to 5.0 mm.

In the blending of the polyethylene terephthalate (A) with the polyethylene isophthalate copolymer (B), a transesterification catalyst and a lubricant may be optionally added.

Examples of the transesterification catalysts include germanium dioxide, antimony trioxide, antimony acetate, manganese acetate, magnesium acetate, cobalt acetate, calcium acetate, zinc acetate and titanium tetrabutoxide. The transesterification catalyst is desirably used in an amount of 0.0005 to 0.1 part by weight, preferably 0.001 to 0.05 part by weight, based on 100 parts by weight of the blend.

Examples of the (external) lubricants include magnesium stearate and calcium stearate. The lubricant may be externally added in an amount of 0.0005 to 0.1 part by weight, preferably 0.001 to 0.05 part by weight, based on 100 parts by weight of the blend.

The resulting blend desirably has a heat-up crystallizing temperature (Tcc) of not higher than 190° C., preferably not higher than 180° C., more preferably 120 to 170° C.

The heat-up crystallizing temperature (Tcc) is determined, using a differential scanning calorimeter of DSC-7 model manufactured by Perkin Elmer Co., in the following manner.

A sample of about 10 mg is collected from the center of the chip of the polyester blend which has been dried under a pressure of about 15 mmHg at about 140° C. for at least about 5 hours. The sample is introduced in an aluminum pan for liquids of the DSC in a nitrogen atmosphere, and the pan is closed. The sample is first rapidly heated from room temperature at a heating rate of 320° C./min, maintained at 290° C. for 10 minutes under melting, thereafter rapidly cooled to room temperature at a cooling rate of 320° C./min, maintained at room temperature for 10 minutes and finally heated at a heating rate of 10° C./min, to detect exothermic peaks, and the temperature at the maximum peak is found.

The blend desirably has an intrinsic viscosity, as measured in o-chlorophenol at 25° C., of 0.3 to 0.9 dl/g, preferably 0.35 to 0.85 dl/g.

Crystallization of Blend

The pellets of the blend obtained as above are then crystallized.

Crystallization of the pellets is carried out by maintaining the pellets in a dry state at a temperature of not lower than the glass transition temperature (Tg) and lower than the melting point, preferably a temperature higher than Tg by 20° C. and lower than the melting point by 40°C., for 1 to 300 minutes, preferably 5 to 200 minutes. More specifically, the pellets may be heated at a temperature of 80 to 210° C., preferably 100 to 180° C.

The crystallization can be carried out in air or in an inert gas atmosphere.

The polyester blend thus crystallized desirably has a crystallinity of 20 to 50%.

In the crystallization, solid phase polymerization of polyester does not proceed, so that the intrinsic viscosity of the polyester blend after the crystallization is almost equal to the intrinsic viscosity of the polyester blend before the crystallization, and the difference between the intrinsic viscosity of the polyester blend before and after the crystallization is usually not more than 0.06 dl/g.

By the crystallization of the polyester blend, the acetaldehyde content in the polyester can be decreased.

In the present invention, the crystallized blend may be subjected to solid phase polymerization, if desired. The crystallization conducted before solid phase polymerization is sometimes referred to as "precrystallization".

The solid phase polymerization is carried out at a temperature of usually 180 to 230° C., preferably 190 to 220° C. In the solid phase polymerization, the pellets of the blend are desired to be in a dry state, and therefore the pellets of the blend may be beforehand dried at a temperature of 80 to 180° C.

The polyester pellets obtained after the solid phase polymerization have an intrinsic viscosity ($\eta$), as measured in o-chlorophenol at 25° C., of 0.5 to 1.5 dl/g, preferably 0.6 to 1.5 dl/g, more preferably 0.6 to 1.2 dl/g. It is desirable that this intrinsic viscosity is about 1.1 to 2.5 times, preferably 1.2 to 2.0 times, greater than the intrinsic viscosity of the blend before the solid phase polymerization.

The polyester pellets may be then subjected to a hot water treatment. The hot water treatment can be carried out by immersing the polyester pellets in hot water of 70 to 120° C. for 1 to 360 minutes. Through the hot water treatment, the catalyst used for the polyester polycondensation reaction can be deactivated.

The polyester pellets obtained by the process of the invention may optionally contain additives commonly added to polyesters, such as colorants, antioxidants, oxygen absorbents, ultraviolet light absorbers, antistatic agents and flame retardants.

The polyester pellets prepared by the process of the invention can be used as a material of various molded products such as preforms, bottles, (oriented) films and sheets. The bottles produced from the polyester pellets are excellent in gas barrier properties, transparency and heat resistance. Moreover, the bottles hardly generate acetaldehyde, so that the taste of the contents such as juice does not deteriorate.

Process (2) for Preparing Polyester Pellets

Another process for preparing polyester pellets according to the invention comprises the steps of:
blending (C) polyethylene terephthalate after solid phase polymerization having an intrinsic viscosity of 0.5 to 1.5 dl/g, in an amount of 20 to 99% by weight, with (B) a polyethylene isophthalate copolymer before solid phase polymerization having an intrinsic viscosity of 0.3 to 0.9 dl/g, in an amount of 1 to 80% by weight,
pelletizing the blend,
crystallizing the pellets,
and preferably
further subjecting the pellets to solid phase polymerization.

(C) Polyethylene Terephthalate

The polyethylene terephthalate (C) for use in the invention comprises dicarboxylic acid units derived from terephthalic acid or its ester derivative and diol units derived from ethylene glycol or its ester derivative.

The dicarboxylic acid units in the polyethylene terephthalate (C) desirably contain terephthalic acid units in amounts of not less than 80% by mol, preferably 85 to 100% by mol, based on 100% by mol of the dicarboxylic acid units.

Examples of other dicarboxylic acids which may be contained in amounts of not more than 20% by mol include those dicarboxylic acids as previously exemplified with respect to the polyethylene terephthalate (A). Particularly preferable is isophthalic acid The diol units in the polyethylene terephthalate (C) desirably contain ethylene glycol units in amounts of not less than 80% by mol, preferably 85 to 100% by mol, based on 100% by mol of the diol units.

Examples of other diols which may be contained in amounts of not more than 20% by mol include those diols as previously exemplified with respect to the polyethylene terephthalate (A). Particularly preferable are diethylene glycol and cyclohexanedimethanol.

The polyethylene terephthalate (C) may further contain units derived from polyfunctional carboxylic acids having 3 or more carboxyl groups and polyhydric alcohols having 3 or more hydroxyl groups, within limits not prejudicial to the object of the invention. Examples of polyfunctional carboxylic acids are trimesic acid and pyromellitic anhydride, and examples of polyhydric alcohols are glycerol, 1,1,1-trimethylolethane, 1,1,1-trimethylolpropane, 1,1,1-trimethylolmethane and pentaerythritol.

The polyethylene terephthalate (C) is substantially linear, and this can be confirmed by the fact that the polyethylene terephthalate (C) is dissolved in o-chlorophenol.

The polyethylene terephthalate (C) desirably has an intrinsic viscosity ($\eta$), as measured in o-chlorophenol at 25° C., of 0.5 to 1.5 dl/g, preferably 0.6 to 1.1 dl/g, and in a product obtained after solid phase polymerization.

It is desirable that the polyethylene terephthalate (C) has a melting point, as measured by a differential scanning calorimeter (DSC, heating rate: 10° C./min), of usually 230 to 270° C., preferably 240 to 260° C., and has a glass transition temperature of usually 58 to 75° C., preferably 60 to 70° C.

The polyethylene terephthalate (C) can be prepared by a conventional process. For example, the aforesaid dicarboxylic acid and diol are directly esterified, then melt polycondensed in the presence of a polycondensation catalyst such as a germanium compound (e.g. germanium dioxide), an antimony compound (e.g., antimony trioxide, antimony acetate) or a titanium compound (e.g., titanium tetraalkoxide) and subjected to solid phase polymerization. In another example to prepare the polyethylene terephthalate (C), an ester of the dicarboxylic acid and the diol are subjected to transesterification in the presence of a transesterification catalyst such as a titanium alkoxide (e.g., titanium tetrabutoxide, titanium isopropoxide) or a metallic salt of acetic acid (e.g., cobalt acetate, zinc acetate, magnesium acetate, manganese acetate, calcium acetate). Preferable transesterification catalysts are titanium tetrabutoxide and zinc acetate. Thereafter, the transesteriffication product is subjected to melt polycondensed in the presence of a polycondensation catalyst such as a germanium compound (e.g. germanium dioxide), an antimony compound (e.g., antimony trioxide, antimony acetate) or a titanium compound (e.g., titanium tetraalkoxide) and subjected to solid phase polymerization. The solid phase polymerization is carried out by heating the melt polycondensation product at a temperature of usually 180 to 230° C., preferably 190 to 220° C. In the solid phase polymerization, the melt polycondensation product is desired to be in a dry state, and therefore the melt polycondensation product may be beforehand dried at a temperature of 80 to 180° C.

(B) Polyethylene Isophthalate Copolymer

The polyethylene isophthalate copolymer (B) comprises dicarboxylic acid constituent units derived from dicarboxylic acids containing terephthalic acid and isophthalic acid and diol constituent units derived from diols containing ethylene glycol and 1,3-bis(2-hydroxyethoxy)benzene. This polyethylene isophthalate copolymer (B) is the same as the polyethylene isophthalate copolymer (B) previously described with respect to the process (1) of the present invention.

Blending of Polyesters

In the process of the invention, 99 to 20% by weight, preferably 99 to 40% by weight, more preferably 98 to 50% by weight, of the polyethylene terephthalate (C) and 1 to 80% by weight, preferably 1 to 60% by weight, more preferably 2 to 50% by weight, of the polyethylene isophthalate copolymer (B) are blended with each other.

The blending is carried out by mixing the polyethylene terephthalate (C) with the polyethylene isophthalate copolymer (B) in the above mixing ratio and melt kneading them at 260 to 310° C. for 30 to 300 seconds. After the kneading, the resulting blend is pelletized by means of an extruder or the like. The average diameter of the pellets is preferably in the range of 2.0 to 5.0 mm.

In the blending of the polyethylene terephthalate (C) with the polyethylene isophthalate copolymer (B), a transesterification catalyst and a lubricant may be added, as described for the process (1) of the invention.

The resulting blend desirably has an intrinsic viscosity, as measured in o-chlorophenol at 25° C., of 0.3 to 0.9 dl/g, preferably 0.35 to 0.85 dl/g.

The blend desirably has a heat-up crystallizing temperature (Tcc) of not higher than 170° C., preferably not higher than 160° C., more preferably 100 to 155° C.

Crystallization of Blend

The pellets of the blend obtained as above are then crystallized.

Crystallization of the pellets is carried out by maintaining the pellets in a dry state at a temperature of not lower than the glass transition temperature (Tg) and lower than the melting point, preferably a temperature higher than Tg by 20° C. and lower than the melting point by 40° C., for 1 to 300 minutes, preferably 5 to 200 minutes. More specifically, the pellets may be heated at a temperature of 80 to 210° C., preferably 100 to 180° C.

The crystallization can be carried out in air or in an inert gas atmosphere.

The polyester blend thus crystallized desirably has a crystallinity of 20 to 50%.

In the crystallization, solid phase polymerization of polyester does not proceed, so that the intrinsic viscosity of the polyester blend after the crystallization is almost equal to the intrinsic viscosity of the polyester blend before the crystallization, and the difference between the intrinsic viscosity of the polyester blend before and after the crystallization is usually not more than 0.06 dl/g.

In the present invention, the pellets may be subjected to solid phase polymerization after the crystallization. The solid phase polymerization is carried out at a temperature of usually 180 to 230° C., preferably 190 to 220° C., as described for the process (1). In the solid phase polymerization, the pellets of the blend are desired to be in a dry state, and therefore the pellets of the blend may be beforehand dried at a temperature of 80 to 180° C.

The polyester pellets may be then subjected to a hot water treatment, as described for the process (1). The hot water treatment can be carried out by immersing the solid phase polymerization product in hot water of 70 to 120° C. for 1 to 360 minutes.

The polyester pellets obtained by the process of the invention may optionally contain additives commonly added to polyesters, such as colorants, antioxidants, oxygen absorbents, ultraviolet light absorbers, antistatic agents and flame retardants.

The polyester pellets prepared by the process of the invention can be used as a material of various molded products such as preforms, bottles, (oriented) films and sheets. The bottles produced from the polyester pellets are excellent in gas barrier properties, transparency and heat resistance. Moreover, the bottles hardly generate acetaldehyde, so that the taste of the contents such as juice does not deteriorate.

EFFECT OF THE INVENTION

By the use of the polyester pellets of the invention, a dry feed line of materials to an injection molding machine or an extruder can be extremely simplified, so that the cost of equipment can be sharply reduced. Further, molded products of the polyester pellets can be prominently prevented from scorching even when molding is continuously carried out for a long period of time. Moreover, the molded products are excellent in gas barrier properties, transparency and heat resistance and have a low content of acetaldehyde. Particularly, bottles of the polyester pellets not only have such excellent properties but also exhibit such high strength that delamination hardly takes place even when they are cut with a knife.

EXAMPLE

The present invention is further described with reference to the following examples, but it should be construed that the invention is in no way limited to those examples.

In the following examples, properties were evaluated by the methods described below.

Intrinsic Viscosity

A sample was dissolved in an o-chlorophenol solvent to prepare a sample solution having a concentration of 1 g/dl, and the solution viscosity of the solution was measured at 25° C. by means of an Ubbelohde capillary viscometer. Then, o-chlorophenol was slowly added to the solution to measure solution viscosities on the low concentration side. From the obtained data, the viscosity at the concentration of 0% was extrapolated.

Carbon Dioxide Gas Permeability Constant (Gas Barrier Properties)

The carbon dioxide gas permeability constant was measured by means of a gas permeability measuring apparatus GPM-250 manufactured by G.L. Science Co. under the conditions of a temperature of 23° C. and a relative humidity of 60%.

The film for use in the measurements was prepared in the following manner.

Oriented film: A film having a thickness of 0.3 mm was prepared by a press molding machine (mold temperature: 290° C.), and the film was rapidly cooled under the conditions of a cooling mold temperature of 0° C. to give an amorphous film. Then, the amorphous film was subjected to simultaneous biaxial orientation (3×3 times) at a temperature higher by 15° C. than the glass transition temperature (Tg) to obtain an oriented film.

Acetaldehyde Content

From the molded product, a sample of about 2 g was collected, and the sample was freeze crushed by means of a freeze crusher (manufactured by SPEX Co.) to obtain a powdered sample. Then, 1 g of the powdered sample was introduced into a vial, and 2 ml of distilled water was added thereto, followed by sufficiently mixing them. After the vial was capped, it was heated at 120° C. for 1 hour. Then, the vial was cooled in ice water, and 5 μl of the supernatant was measured on the acetaldehyde content by gas chromatography (GC-6A manufactured by Shimazu Seisakusho K.K.).

Heat-up Crystallization Calorific Value

In this measurement, a differential scanning calorimeter (DSC) manufactured by Perkin Elmer Co. was used.

A sample of 10 mg was weighed and introduced into a sample pan. In a nitrogen atmosphere, the sample was heated from room temperature up to 290° C. at a heating rate of 320° C./min, then maintained for 10 minutes, thereafter rapidly cooled to 30° C., maintained for 10 minutes and finally heated at a heating rate of 10° C./min. From the area of the peak at the crystallizing temperature found between the glass transition temperature and the melting point, the calorific value was measured.

Melting Point

In this measurement, a differential scanning calorimeter (DSC) manufactured by Perkin Elmer Co. was used.

A sample of 10 mg was weighed and introduced into a sample pan. In a nitrogen atmosphere, the sample was maintained at 30° C. for 10 minutes and then heated up to 290° C. at a heating rate of 10° C./min to find the peak temperature as the melting point.

Density

In a constant-temperature bath of 23° C., zinc (II) chloride, hydrochloric acid and water were mixed to prepare an aqueous solution having a given density. After the aqueous solution was allowed to stand for at least 48 hours, a sample was introduced into the aqueous solution to measure the density of the sample.

Example 1

Polyethylene Terephthalate (A-1)

A slurry consisting of 332 g of high-purity terephthalic acid and 143 g of ethylene glycol was prepared. To the slurry, 0.042 g of germanium dioxide and 0.080 g of phosphoric acid were added. The resulting slurry was heated to a temperature of 255° C. under a pressure of 1.7 kg/cm$^2$ (absolute pressure) to perform esterification reaction until the degree of esterification became 95%, whereby a low molecular weight polymer was prepared. Then, the low molecular weight polymer was melt polymerized at a temperature of 280° C. under a reduced pressure of 1 Torr to produce a prepolymer of polyethylene terephthalate (A-1) having an intrinsic viscosity of 0.615 dl/g. The prepolymer was extruded from a nozzle to give a strand, and the strand was cut into column-like pellets having a diameter of 2.5 mm and a height of 3.5 mm. The prepolymer had a heat-up crystallizing temperature of 158° C.

Polyethylene Isophthalate Copolymer (B-1)

A slurry consisting of 299 g of isophthalic acid, 33 g of terephthalic acid, 122 g of ethylene glycol and 21 g of 1,3-bis(2-hydroxyethoxy)benzene was prepared. To the slurry, 0.042 g of germanium dioxide and 0.080 g of phosphoric acid were added. The resulting slurry was heated to a temperature of 255° C. under a pressure of 1.7 kg/cm$^2$ (absolute pressure) to perform esterification reaction until the degree of esterification became 95%, whereby a low molecular weight polymer was prepared. Then, the low molecular weight polymer was melt polymerized at a temperature of 280° C. under a reduced pressure of 1 Torr to produce a prepolymer of a polyethylene isophthalate copolymer (B-1) which had a molar ratio of isophthalic acid-:terephthalic acid=90:10 and a molar ratio of ethylene glycol:1,3-bis(2-hydroxyethoxy)benzene=85:15 and had an intrinsic viscosity of 0.815 dl/g. The prepolymer was extruded from a nozzle to give a strand, and the strand was cut into column-like pellets having a diameter of 2.5 mm and a height of 3.5 mm.

Blending

A dry blend of 90 parts by weight of the prepolymer of the polyethylene terephthalate (A-1) and 10 parts by weight of the prepolymer of the polyethylene isophthalate copolymer (B-1) was melt kneaded at a molding temperature of 275° C. by means of a single-screw extruder (diameter: 20 mm, manufactured by Thermo Co.). The kneadate was extruded from a nozzle to give a strand, and the strand was cut into column-like pellets (C-1) having a diameter of 2.5 mm and a height of 3.5 mm. The prepolymer blend had a heat-up crystallizing temperature of 146° C.

Solid Phase Polymerization

The pellets (C-1) obtained above were precrystallized at 170° C. for 2 hours in a stream of nitrogen and then subjected to solid phase polymerization at 210° C. for 16 hours in a nitrogen atmosphere.

The resulting polyester had an intrinsic viscosity of 0.835 dl/g. The oriented film produced from the polyester had a carbon dioxide gas permeability constant of 10.5 cc·mm/ $m^2$·day·atm and an acetaldehyde content of 11 ppm.

Example 2

Blending

A dry blend of 60 parts by weight of the prepolymer of the polyethylene terephthalate (A-1) prepared in Example 1 and 40 parts by weight of the prepolymer of the polyethylene isophthalate copolymer (B-1) prepared in Example 1 was melt kneaded at a molding temperature of 275° C. by means of a single-screw extruder (diameter: 20 mm, manufactured by Thermo Co.). The kneadate was extruded from a nozzle to give a strand, and the strand was cut into column-like pellets (C-2) having a diameter of 2.5 mm and a height of 3.5 mm. The prepolymer blend had a heat-up crystallizing temperature of 158° C.

Solid Phase Polymerization

The pellets (C-2) obtained above were precrystallized at 170° C. for 2 hours in a stream of nitrogen and then subjected to solid phase polymerization at 210° C. for 16 hours in a nitrogen atmosphere.

The resulting polyester had an intrinsic viscosity of 0.842 dl/g. The oriented film produced from the polyester had a carbon dioxide gas permeability constant of 6.1 cc·mm/ $m^2$·day·atm and an acetaldehyde content of 13 ppm.

Example 3

Polyethylene Terephthalate (A-2)

A slurry consisting of 388 g of dimethyl terephthalate and 136 g of ethylene glycol was prepared. To the slurry, 0.049 g of manganese acetate tetrahydrate was added, and the mixture was heated to 180° C. at atmospheric pressure to perform esterification. reaction until the degree of esterification became 95%, whereby a low molecular weight polymer was prepared. To the low molecular weight polymer, 0.042 g of germanium dioxide and 0.080 g of phosphoric acid were added, and melt polymerization of the low molecular weight polymer was conducted at a temperature of 280° C. under a reduced pressure of 1 Torr to produce a prepolymer of polyethylene terephthalate (A-2) having an intrinsic viscosity of 0.598 dl/g. The prepolymer was extruded from a nozzle to give a strand, and the strand was cut into column-like pellets having a diameter of 2.5 mm and a height of 3.5 mm. The prepolymer had a heat-up crystallizing temperature of 153° C.

Polyethylene Isophthalate Copolymer (B-2)

A slurry consisting of 350 g of dimethyl isophthalate, 39 g of dimethyl terephthalate, 116 g of ethylene glycol and 21 g of 1,3-bis(2-hydroxyethoxy)benzene was prepared. To the slurry, 0.049 g of manganese acetate tetrahydrate was added, and the mixture was heated to 180° C. at atmospheric pressure to perform esterification reaction until the degree of esterification became 95%, whereby a low molecular weight polymer was prepared. To the low molecular weight polymer, 0.042 g of germanium dioxide and 0.080 g of phosphoric acid were added, and melt polymerization of the low molecular weight polymer was conducted at a temperature of 280° C. under a reduced pressure of 1 Torr to produce a prepolymer of a polyethylene isophthalate copolymer (B-2) which had a molar ratio of isophthalic acid constituent units: terephthalic acid constituent units=90:10 and a molar ratio of ethylene glycol:1,3-bis(2-hydroxyethoxy)benzene= 85:15 and had an intrinsic viscosity of 0.826 dl/g. The prepolymer was extruded from a nozzle to give a strand, and the strand was cut into column-like pellets having a diameter of 2.5 mm and a height of 3.5 mm.

Blending

A dry blend of 90 parts by weight of the prepolymer of the polyethylene terephthalate (A-2) and 10 parts by weight of the prepolymer of the polyethylene isophthalate copolymer (B-2) was melt kneaded at a molding temperature of 275° C. by means of a single-screw extruder (diameter: 20 mm, manufactured by Thermo Co.). The kneadate was extruded from a nozzle to give a strand, and the strand was cut into column-like pellets (C-3) having a diameter of 2.5 mm and a height of 3.5 mm. The prepolymer blend had a heat-up crystallizing temperature of 153° C.

Solid Phase Polymerization

The pellets (C-3) obtained above were precrystallized at 170° C. for 2 hours in a stream of nitrogen and then subjected to solid phase polymerization at 210° C. for 16 hours in a nitrogen atmosphere.

The resulting polyester had an intrinsic viscosity of 0.838 dl/g. The oriented film produced from the polyester had a carbon dioxide gas permeability constant of 10.2 cc·mm/ $m^2$·day·atm and an acetaldehyde content of 10 ppm.

Example 4

Polyethylene Terephthalate (A-3)

A slurry consisting of 332 g of high-purity terephthalic acid and 143 g of ethylene glycol was prepared. To the slurry, 0.042 g of germanium dioxide and 0.080 g of phosphoric acid were added. The resulting slurry was heated to a temperature of 255° C. under a pressure of 1.7 kg/cm² (absolute pressure) to perform esterification reaction until the degree of esterification became 95%, whereby a low molecular weight polymer was prepared. Then, the low molecular weight polymer was melt polymerized at a temperature of 280° C. under a reduced pressure of 1 Torr to produce a prepolymer of polyethylene terephthalate (A-3) having an intrinsic viscosity of 0.615 dl/g. The prepolymer was extruded from a nozzle to give a strand, and the strand was cut into column-like pellets having a diameter of 2.5 mm and a height of 3.5 mm. The prepolymer had a heat-up crystallizing temperature of 158° C.

Polyethylene Isophthalate Copolymer (B-3)

A slurry consisting of 299 g of isophthalic acid, 33 g of terephthalic acid, 122 g of ethylene glycol and 21 g of 1,3-bis(2-hydroxyethoxy)benzene was prepared. To the slurry, 0.095 g of antimony acetate and 0.080 g of phosphoric acid were added. The resulting slurry was heated to a temperature of 255° C. under a pressure of 1.7 kg/cm² (absolute pressure) to perform esterification reaction until the degree of esterification became 95%, whereby a low molecular weight polymer was prepared. Then, the low molecular weight polymer was melt polymerized at a temperature of 280° C. under a reduced pressure of 1 Torr to produce a prepolymer of a polyethylene isophthalate copolymer (B-3) which had a molar ratio of isophthalic acid: terephthalic acid=90:10 and a molar ratio of ethylene glycol:1,3-bis(2-hydroxyethoxy)benzene=85:15 and had an intrinsic viscosity of 0.830 dl/g. The prepolymer was extruded from a nozzle to give a strand, and the strand was cut into column-like pellets having a diameter of 2.5 mm and a height of 3.5 mm.

Blending

A dry blend of 90 parts by weight of the prepolymer of the polyethylene terephthalate (A-3) and 10 parts by weight of the prepolymer of the polyethylene isophthalate copolymer (B-3) was melt kneaded at a molding temperature of 275° C. by means of a single-screw extruder (diameter: 20 mm, manufactured by Thermo Co.). The kneadate was extruded from a nozzle to give a strand, and the strand was cut into column-like pellets (C-4) having a diameter of 2.5 mm and a height of 3.5 mm. The prepolymer blend had a heat-up crystallizing temperature of 146° C.

Solid Phase Polymerization

The pellets (C-4) obtained above were precrystallized at 170° C. for 2 hours in a stream of nitrogen and then subjected to solid phase polymerization at 210° C. for 16 hours in a nitrogen atmosphere.

The resulting polyester had an intrinsic viscosity of 0.836 dl/g. The oriented film produced from the polyester had a carbon dioxide gas permeability constant of 10.3 cc·mm/m²·day·atm and an acetaldehyde content of 11 ppm.

Comparative Example 1

The prepolymer of the polyethylene terephthalate (A-1) obtained in Example 1 was melt kneaded at a molding temperature of 275° C. by means of a single-screw extruder (diameter: 20 mm, manufactured by Thermo Co.). The kneadate was extruded from a nozzle to give a strand, and the strand was cut into column-like pellets (C-5) having a diameter of 2.5 mm and a height of 3.5 mm. The prepolymer had a heat-up crystallizing temperature of 142° C.

The pellets (C-5) obtained above were precrystallized at 170° C. for 2 hours in a stream of nitrogen and then subjected to solid phase polymerization at 210° C. for 16 hours in a nitrogen atmosphere.

The resulting polyester had an intrinsic viscosity of 0.830 dl/g. The oriented film produced from the polyester had a carbon dioxide gas permeability constant of 16.8 cc·mm/m²·day·atm and an acetaldehyde content of 14 ppm.

Comparative Example 2

Polyethylene Isophthalate (B-4)

A slurry consisting of 332 g of isophthalic acid and 142 g of ethylene glycol was prepared. To the slurry, 0.042 g of germanium dioxide and 0.080 g of phosphoric acid were added. The resulting slurry was heated to a temperature of 255° C. under a pressure of 1.7 kg/cm² (absolute pressure) to perform esterification reaction until the degree of esterification became 95%, whereby a low molecular weight polymer was prepared. Then, the low molecular weight polymer was melt polymerized at a temperature of 280° C. under a reduced pressure of 1 Torr to produce a prepolymer of polyethylene isophthalate (B-4) having an intrinsic viscosity of 0.625 dl/g. The prepolymer was extruded from a nozzle to give a strand, and the strand was cut into column-like pellets having a diameter of 2.5 mm and a height of 3.5 mm.

Blending

A dry blend of 90 parts by weight of the prepolymer of the polyethylene terephthalate (A-1) obtained in Example 1 and 10 parts by weight of the prepolymer of the polyethylene isophthalate (B-4) was melt kneaded at a molding temperature of 275° C. by means of a single-screw extruder (diameter: 20 mm, manufactured by Thermo Co.). The kneadate was extruded from a nozzle to give a strand, and the strand was cut into column-like pellets (C-6) having a diameter of 2.5 mm and a height of 3.5 mm. The prepolymer blend had a heat-up crystallizing temperature of 156° C.

Solid Phase Polymerization

The pellets (C-6) obtained above were precrystallized at 170° C. for 2 hours in a stream of nitrogen and then subjected to solid phase polymerization at 210° C. for 16 hours in a nitrogen atmosphere.

The resulting polyester had an intrinsic viscosity of 0.841 dl/g. The oriented film produced from the polyester pellets had a carbon dioxide gas permeability constant of 12.5 cc·mm/m²·day·atm and an acetaldehyde content of 16 ppm.

Comparative Example 3

Solid Phase Polymerization Product of Polyethylene Terephthalate

A slurry consisting of 332 g of high-purity terephthalic acid and 143 g of ethylene glycol was prepared. To the slurry, 0.042 g of germanium dioxide and 0.080 g of phosphoric acid were added. The resulting slurry was heated to a temperature of 255° C. under a pressure of 1.7 kg/cm² (absolute pressure) to perform esterification reaction until the degree of esterification became 95%, whereby a low molecular weight polymer was prepared. The low molecular weight polymer was melt polymerized at a temperature of 280° C. under a reduced pressure of 1 Torr to produce a prepolymer of polyethylene terephthalate (A-1) having an intrinsic viscosity of 0.615 dl/g. The prepolymer was extruded from a nozzle to give a strand, and the strand was cut into column-like pellets having a diameter of 2.5 mm and a height of 3.5 mm. The prepolymer had a heat-up crystallizing temperature of 158° C. Then, the pellets were precrystallized at 170° C. for 2 hours in a stream of nitrogen and then subjected to solid phase polymerization at 210° C. for 16 hours in a nitrogen atmosphere.

Blending

A dry blend of 90 parts by weight of the solid phase polymerization product of the polyethylene terephthalate (A-1) and 10 parts by weight of the prepolymer of the polyethylene isophthalate copolymer (B-1) obtained in Example 1 was melt kneaded at a molding temperature of 275° C. by means of a single-screw extruder (diameter: 20 mm, manufactured by Thermo Co.). The kneadate was extruded from a nozzle to give a strand, and the strand was cut into column-like pellets (C-7) having a diameter of 2.5 mm and a height of 3.5 mm. The polyester blend had a heat-up crystallizing temperature of 156° C.

From the column-like pellets (C-7), an oriented film was produced. The film had a carbon dioxide gas permeability constant of 11.8 cc·mm/m²·day·atm and an acetaldehyde content of 22 ppm.

Comparative Example 4

Polyethylene Terephthalate Copolymer (A-4)

A slurry consisting of 299 g of terephthalic acid, 33 g of isophthalic acid, 122 g of ethylene glycol and 21 g of 1,3-bis(2-hydroxyethoxy)benzene was prepared. To the slurry, 0.042 g of germanium dioxide and 0.080 g of phosphoric acid were added. The resulting slurry was heated to a temperature of 255° C. under a pressure of 1.7 kg/cm² (absolute pressure) to perform esterification reaction until the degree of esterification became 95%, whereby a low molecular weight polymer was prepared. Then, the low molecular weight polymer was melt polymerized at a temperature of 280° C. under a reduced pressure of 1 Torr to produce a prepolymer of a polyethylene terephthalate copolymer (A-4) which had a molar ratio of terephthalic acid: isophthalic acid=90:10 and a molar ratio of ethylene glycol:1,3-bis(2-hydroxyethoxy)benzene=85:15 and had an intrinsic viscosity of 0.623 dl/g. The prepolymer was extruded from a nozzle to give a strand, and the strand was cut into column-like pellets having a diameter of 2.5 mm and a height of 3.5 mm. The prepolymer had a heat-up crystallizing temperature of 163° C.

The pellets obtained above were precrystallized at 170° C. for 2 hours in a stream of nitrogen and then subjected to solid phase polymerization at 210° C. for 16 hours in a nitrogen atmosphere.

The resulting polyester had an intrinsic viscosity of 0.841 dl/g. The oriented film produced from the polyester pellets had a carbon dioxide gas permeability constant of 14.2 cc·mm/m²·day·atm and an acetaldehyde content of 13 ppm.

TABLE 1

| | Polyethylene terephthalate prepolymer (parts by weight) | Polyethylene isophthalate prepolymer (parts by weight) | $m_I$ | $m_B$ | Solid phase polymerization after blending | Intrinsic viscosity (dl/g) |
|---|---|---|---|---|---|---|
| Ex. 1 | A-1: 90 | B-1: 10 | 9 | 1.5 | done | 0.835 |
| Ex. 2 | A-1: 60 | B-1: 40 | 36 | 6 | done | 0.842 |
| Ex. 3 | A-2: 90 | B-2: 10 | 9 | 1.5 | done | 0.838 |
| Ex. 4 | A-3: 90 | B-3: 10 | 9 | 1.5 | done | 0.836 |
| Comp. Ex. 1 | A-1: 100 | | | | *2 | 0.830 |
| Comp. Ex. 2 | A-1: 90 | B-4: 10 | 10 | 0 | done | 0.841 |
| Comp. Ex. 3 | Solid phase polymerization product of A-1: 90 | B-1: 10 | 9 | 1.5 | not done | 0.820*1 |
| Comp. Ex. 4 | A-4: 100 | | 10 | 15 | *2 | 0.841 |

| | $CO_2$ gas permeability constant (*3) | $CH_3CHO$ content (ppm) | Heat-up crystallization calorific value (J/g) | Density of pellets (kg/m³) | *4 (° C.) | Tm (° C.) |
|---|---|---|---|---|---|---|
| Ex. 1 | 10.5 | 11 | 25 | 1395 | 230 | 249 |
| Ex. 2 | 6.1 | 13 | 20 | 1392 | 162 | 239 |
| Ex. 3 | 10.2 | 10 | 27 | 1397 | 230 | 249 |
| Ex. 4 | 10.3 | 11 | 26 | 1396 | 230 | 250 |
| Comp. Ex. 1 | 16.8 | 14 | 35 | 1400 | 254 | 261 |
| Comp. Ex. 2 | 12.5 | 16 | 28 | 1398 | 231 | 247 |
| Comp. Ex. 3 | 11.8 | 22 | 30 | 1340 | 230 | 253 |
| Comp. Ex. 4 | 14.2 | 13 | 31 | 1362 | 198 | *5 |

*1: The intrinsic viscosity in Comp. Ex. 3 is an intrinsic viscosity of a blend because polyethylene terephthalate after solid phase polymerization was used in Comp. Ex. 3.
*2: In comp. Ex. 1, the prepolymer of polyethylene terephthalate (A-1) was subjected to solid phase polymerization, and in Comp. Ex. 4, the prepolymer of polyethylene terephthalate (A-4) was subjected to solid phase polymerization.
*3: The carbon dioxide gas permeability constant is expressed in cc · mm/m²· day · atm.
*4: $[1/527 - 0.0017 \cdot \ln(1 - (m_I + m_B)/200)]^{-1} - 273$
*5: Not observed

Example 5

Polyethylene Terephthalate (A-5)

Using a continuous polycondensation apparatus consisting of the first, the second, the third, the fourth and the fifth reactors of tank type and the sixth reactor of horizontal biaxial rotary type, polymerization was continuously conducted in the following manner to prepare polyethylene terephthalate (A-5).

To the first reactor containing 3,750 parts by weight of a reaction solution and maintained at 255° C. and 1.7 kg/cm² G in a nitrogen atmosphere with stirring, was continuously fed a slurry prepared by mixing 1,437 parts by weight per hour of high-purity terephthalic acid with 519 parts by weight per hour of ethylene glycol, to perform esterification reaction of the first stage. In the esterification reaction of the first stage, a mixture of 203 parts by weight of water and 3 parts by weight of ethylene glycol was distilled off. The esterification reaction product of the first stage was controlled so that the mean residence time thereof became 2.0 hours, and was continuously introduced into the second reactor maintained at 260° C. and 0.8 kg/cm² G with stirring. To the second reactor, was continuously fed a homogeneous solution of 0.48 parts by weight per hour of germanium dioxide and 32 parts by weight per hour of ethylene glycol, while a mixture of 84 parts by weight per hour of water and 5 parts by weight per hour of ethylene glycol was continuously distilled off. The esterification reaction product of the second stage was controlled so that the mean residence time thereof became 2.0 hours, and was continuously introduced into the third reactor maintained at 265° C. and atmospheric pressure with stirring. To the third reactor, was continuously fed a homogeneous solution obtained by mixing 1.23 parts by weight per hour of trimethyl phosphate with 22 parts by weight per hour of ethylene glycol, while a mixture of 21 parts by weight per hour of water and 27 parts by weight per hour of ethylene glycol was continuously distilled off, whereby esterification reaction of the third stage was conducted.

The esterification reaction product of the third stage was controlled so that the mean residence time thereof became 2.0 hours, and was continuously introduced into the fourth reactor maintained at 275° C. and 60 mmHg with stirring. In the fourth reactor, plycondesnation reaction of the first stage was performed by continuously distilling off a mixture of 45 parts by weight per hour of ethylene glycol and 6 parts by weight per hour of water. The polycondensation reaction product of the first stage was controlled so that the mean residence time thereof became 1.0 hour, and was continuously introduced into the fifth reactor maintained at 282° C. and 3 mmHg with stirring.

In the fifth reactor, polycondensation reaction of the second stage was performed by continuously distilling of a mixture of 20 parts by weight per hour of ethylene glycol and 3 parts by weight per hour of water. The polycondensation reaction product of the second stage was controlled so that the mean residence time thereof became 1.0 hour, and was continuously introduced into the sixth reactor of horizontal biaxial rotary type maintained at 282 to 285° C. and 1.8 to 2.5 mmHg.

In the sixth reactor, polycondensation reaction of the third stage was performed by continuously distilling off a mixture of 10 parts by weight per hour of ethylene glycol and 1 part by weight per hour of water. The polycondensation reaction product of the third stage was controlled so that the mean residence time thereof became 2.5 hours, and was continuously drawn out of the reactor by means of a polyester drawing device to give a strand. The strand was immersed in water to cool it and cut into pellets by a strand cutter. The polyethylene terephthalate (A-5) obtained through the liquid phase polymerization mentioned above had an intrinsic viscosity (η), as measured in o-chlorophenol at 25° C., of 0.65 dl/g.

Polyethylene Isophthalate Copolymer (B-5)

Using the same apparatus as used for preparing the polyethylene terephthalate (A-5), a polyethylene isophthalate copolymer (B-5) was prepared in the following manner.

To the first reactor containing 3,750 parts by weight of a reaction solution and maintained at 255° C. and 1.7 kg/cm² G in a nitrogen atmosphere with stirring, was continuously fed a slurry prepared by mixing 1,208 parts by weight per hour of isophthalic acid, 135 parts by weight per hour of terephthalic acid, 477 parts by weight per hour of ethylene glycol, 211 parts by weight of per hour of 1,3-bis(2-hydroxyethoxy)benzene and 3.4 parts by weight per hour of 1,1,1,-trimethylolpropane, to perform esterification reaction of the first stage.

The esterification reaction product of the first stage was controlled so that the mean residence time thereof became 2.0 hours, and was continuously introduced into the second reactor maintained at 260° C. and 0.8 kg/cm² G in a nitrogen atmosphere with stirring. To the second reactor, was continuously fed a homogeneous solution of 1.06 parts by weight per hour of antimony acetate, 0.25 parts by weight per hour of cobalt acetate and 32 parts by weight per hour of ethylene glycol. The esterification reaction product of the second stage was controlled so that the mean residence time thereof became 2.0 hours, and was continuously introduced into the third reactor maintained at 265° C. and atmospheric pressure with stirring. To the third reactor, was continuously fed a homogeneous solution obtained by mixing phosphoric of 0.11 part by weight per hour of phosphoric acid and 22 parts by weight per hour of ethylene glycol, to perform esterification reaction of the third stage.

The esterification reaction product of the third stage was controlled so that the mean residence time thereof became 2.0 hours, and was continuously introduced into the fourth reactor maintained at 275° C. and 60 mmHg with stirring.

The polycondensation reaction product in the fourth reactor was controlled so that the mean residence time thereof became 1.0 hour, and was continuously introduced into the fifth reactor maintained at 282° C. and 3 mmHg with stirring.

In the fifth reactor, polycondensation reaction of the second stage was performed by continuously distilling off a mixture of 20 parts by weight per hour of ethylene glycol and 3 parts by weight per hour of water. The polycondensation reaction product of the second stage was controlled so that the mean residence time thereof became 1.0 hour, and was continuously introduced into the sixth reactor of horizontal biaxial rotary type maintained at 282 to 285° C. and 1.8 to 2.5 mmHg.

In the sixth reactor, polycondensation reaction of the third stage was performed by continuously distilling off a mixture of 10 parts by weight per hour of ethylene glycol and 1 part by weight per hour of water. The polycondensation reaction product of the third stage was controlled so that the mean residence time thereof became 2.5 hours, and was continuously drawn out of the reactor by means of a polyester drawing device to give a strand. The strand was cut into pellets. The polyethylene isophthalate copolymer (B-5) obtained through the liquid phase polymerization mentioned above had an intrinsic viscosity (η), as measured in o-chlorophenol at 25° C., of 0.85 dl/g. In the copolymer (B-5), the molar ratio between isophthalic acid and terephthalic acid was 90:10, and the molar ratio between ethylene glycol and 1,3-bis(2-hydroxyethoxy)benzene was 88:12.

Blending

A dry blend of 90 parts by weight of the polyethylene terephthalate (A-5) and 10 parts by weight of the polyethylene isophthalate copolymer (B-5) was melt kneaded by means of a vented twin-screw extruder (TEX-45, manufactured by Nippon Seikosho, L/D=33) under the conditions of a screw rotation number of 200 rpm and a temperature of 280° C. The kneadate was extruded at an extrusion rate of 200 kg/hr to give a strand, and the strand was cut into column-like pellets (C-6) having a diameter of 2.5 mm and a height of 3.5 mm. The residence time in the extruder was 12.2 seconds.

Solid Phase Polymerization

The pellets obtained above were precrystallized at 170° C. for 2 hours in a stream of nitrogen and then subjected to solid phase polymerization at 210° C. for 14 hours in a nitrogen atmosphere.

The resulting polyester had an intrinsic viscosity of 0.848 dl/g. The acetaldehyde content in the polyester pellets was 2 ppm. The oriented film produced from the polyester pellets had a carbon dioxide gas permeability constant of 10.1 cc·mm/m$^2$·day·atm.

Examples 6 and 7

Polyester pellets were prepared in the same manner as in Example 5, except that the blending ratio between the polyethylene terephthalate (A-5) and the polyethylene isophthalate copolymer (B-5) was varied as shown in Table 2. The results are set forth in Table 2.

Example 8

Polyester pellets were prepared in the same manner as in Example 5, except that the later-described polyethylene terephthalate (A-7) was used in place of the polyethylene terephthalate (A-5) and the blending ratio between the polyethylene terephthalate (A-7) and the polyethylene isophthalate copolymer (B-5) was set as shown in Table 2. The results are set forth in Table 2.

Example 9

Polyester pellets were prepared in the same manner as in Example 5, except that the blending ratio between the polyethylene terephthalate (A-5) and the polyethylene isophthalate copolymer (B-5) was varied as shown in Table 2 and crystallization was conducted after blending. The results are set forth in Table 2.

TABLE 2

| | A-5 (parts by weight) | A-7 (parts by weight) | B-5 (parts by weight) | Solid phase polymerization Temperature (° C.) | Time (hr) | Intrinsic viscosity (dl/g) | CH$_3$CHO content (ppm) |
|---|---|---|---|---|---|---|---|
| Ex. 5 | 90 | | 10 | 210 | 14 | 0.848 | 2 |
| Ex. 6 | 70 | | 30 | 210 | 11 | 0.822 | 2 |
| Ex. 7 | 50 | | 50 | 200 | 8 | 0.833 | 2 |
| Ex. 8 | | 70 | 30 | 210 | 6 | 0.92 | 2 |
| Ex. 9 | 70 | | 30 | crystallization only, no solid phase polymerization | | 0.69 | 10 |

| | Melting point (° C.) | *1 (° C.) | Heat-up crystallization calorific value (J/g) | Density of pellets (kg/m$^3$) | CO$_2$ gas permeability constant (*2) |
|---|---|---|---|---|---|
| Ex. 5 | 252.2 | 230 | 26 | 1395 | 10.1 |
| Ex. 6 | 251.1 | 186 | 25 | 1393 | 8.0 |
| Ex. 7 | 250.0 | 144 | 17 | 1390 | 6.0 |
| Ex. 8 | 249.9 | 183 | 24 | 1391 | 8.0 |
| Ex. 9 | 251.8 | 186 | 26 | 1380 | 8.1 |

*1: $[1/527 - 0.0017 \cdot \ln(1 - (m_I + m_B)/200)]^{-1} - 273$
*2: The carbon dioxide gas permeability constant is expressed in cc · mm/m$^2$· day · atm Examples 10–13

Polyethylene Terephthalate (A-6)

Using the same apparatus as used for preparing the polyethylene terephthalate (A-5) of Example 5, polyethylene terephthalate (A-6) was prepared in the following manner.

To the first reactor containing 3,750 parts by weight of a reaction solution and maintained at 255° C. and 1.7 kg/cm$^2$ G in a nitrogen atmosphere with stirring, was continuously fed a slurry prepared by mixing of 1,408 parts by weight per hour of high-purity terephthalic acid, 29 parts by weight per hour of isophthalic acid and 591 parts by weight per hour of ethylene glycol, to perform esterification reaction of the first stage. In the esterification reaction of the first stage, a mixture of 203 parts by weight of water and 3 parts by weight of ethylene glycol was distilled off. The esterification reaction product of the first stage was controlled so that the mean residence time thereof became 2.0 hours, and was continuously introduced into the second reactor maintained at 260° C. and 0.8 kg/cm$^2$ G with stirring. To the second reactor, was continuously fed a homogeneous solution of 0.94 part by weight per hour of antimony acetate, 0.10 part by weight per hour of cobalt acetate and 32 parts by weight per hour of ethylene glycol, while a mixture of 84 parts by weight per hour of water and 5 parts by weight per hour of ethylene glycol was continuously distilled off. The esterification reaction product of the second stage was controlled so that the mean residence time thereof became 2.0 hours, and was continuously introduced into the third reactor maintained at 265° C. and atmospheric pressure with stirring. To the third reactor, was continuously fed a homogeneous solution obtained by mixing 0.10 part by weight per hour of phosphoric acid and 22 parts by weight per hour of ethylene glycol, while a mixture of 21 parts by weight per hour of water and 27 parts by weight per hour of ethylene glycol, was continuously distilled off, whereby esterification reaction of the third stage was conducted.

The esterification reaction product of the third stage was controlled so that the mean residence time thereof became 2.0 hours, and was continuously introduced into the fourth reactor maintained at 275° C. and 60 mmHg with stirring. In the fourth reactor, polycondensation reaction of the second stage was performed by distilling off a mixture of 45 parts by weight per hour of ethylene glycol and 6 parts by weight per hour of water. The polycondensation reaction product of the first stage was controlled so that the mean residence time thereof became 1.0 hour, and was continuously introduced into the fifth reactor maintained at 282° C. and 3 mmHg with stirring.

In the fifth reactor, polycondensation reaction of the second stage was performed by distilling off a mixture of 20 parts by weight per hour of ethylene glycol and 3 parts by weight per hour of water. The polycondensation reaction product of the second stage was controlled so that the mean residence time thereof became 1.0 hour,.and was continuously introduced into the sixth reactor of horizontal biaxial rotary type maintained at 285 to 287° C. and 1.8 to 2.5 mmHg.

In the sixth reactor, polycondensation reaction of the third stage was performed by distilling off a mixture of 10 parts by weight per hour of ethylene glycol and 1 part by weight per hour of water. The polycondensation reaction product of the third stage was controlled so that the mean residence time thereof became 2.5 hours, and was continuously drawn out of the reactor by means of a polyester drawing device to give a strand. The strand was immersed in water to cool it and cut into pellets by a strand cutter. The polyethylene terephthalate (A-6) obtained through the liquid phase polymerization mentioned above had an intrinsic viscosity ($\eta$), as measured in o-chlorophenol at 25° C., of 0.65 dl/g. The molar ratio between terephthalic acid and isophthalic acid was 98:2.

Blending and Solid Phase Polymerization

Blending and solid phase polymerization were carried out in the same manner as in Example 5, except that the polyethylene terephthalate (A-6) was used in place of the polyethylene terephthalate (A-5) and the weight ratio between the polyethylene terephthalate (A-6) and the polyethylene isophthalate copolymer (B-5) was set as shown in Table 3. The intrinsic viscosity of the resulting polyester and the acetaldehyde content in the pellets were measured. From the polyester pellets, an oriented film was produced, and the carbon dioxide gas permeability constant of the film was measured. The results are set forth in Table 3.

TABLE 3

| | A-6 (parts by weight) | B-5 (parts by weight) | Solid phase polymerization Tem. (° C.) | Solid phase polymerization Time (hr) | Intrinsic viscosity (dl/g) | $CH_3CHO$ content (ppm) |
|---|---|---|---|---|---|---|
| Ex. 10 | 90 | 10 | 210 | 16 | 0.865 | 2 |
| Ex. 11 | 70 | 30 | 210 | 12 | 0.833 | 2 |
| Ex. 12 | 50 | 50 | 200 | 8 | 0.840 | 2 |
| Ex. 13 | 40 | 60 | 200 | 5 | 0.828 | 2 |

| | Melting point (° C.) | *1 (° C.) | Heat-up crystallization calorific value (J/g) | Density of pellets (kg/m$^3$) | $CO_2$ gas permeability constant (*2) |
|---|---|---|---|---|---|
| Ex. 10 | 251.0 | 226 | 25 | 1395 | 10.8 |
| Ex. 11 | 252.5 | 183 | 24 | 1393 | 7.0 |
| Ex. 12 | 248.2 | 142 | 17 | 1390 | 6.1 |
| Ex. 13 | 250.6 | 123 | 12 | 1388 | 5.7 |

*1: $[1/527 - 0.0017 \cdot \ln(1 - (m_I + m_B)/200)]^{-1} - 273$
*2: The carbon dioxide gas permeability constant is expressed in cc · mm/m$^2$· day · atm Examples 14 and 15

Polyethylene Terephthalate (A-7)

The pellets of the polyethylene terephthalate (A-6) were heated at 170° C. for 2 hours in a stream of nitrogen to precrystallize them and then subjected to solid phase polymerization at 210° C. for 8 hours in a nitrogen atmosphere.

The resulting polyethylene terephthalate (A-7) had an intrinsic viscosity of 0.850 dl/g and an acetaldehyde content of 2 ppm.

Blending and Crystallization

Blending was carried out in the same manner as in Example 5, except that the polyethylene terephthalate (A-7) prepared above was used in place of the polyethylene terephthalate (A-5) and the weight ratio between the polyethylene terephthalate (A-7) and the polyethylene isophthalate copolymer (B-5) was set as shown in Table 4. The resulting pellets were crystallized at 170° C. for 2 hours in a stream of nitrogen.

The intrinsic viscosity of the resulting polyester and the acetaldehyde content in the pellets were measured. From the polyester pellets, an oriented film was produced, and the carbon dioxide gas permeability constant of the film was measured. The results are set forth in Table 4.

TABLE 4

| | A-7 (parts by weight) | B-5 (parts by weight) | Intrinsic viscosity (dl/g) | $CH_3CHO$ content (ppm) | Melting point (° C.) |
|---|---|---|---|---|---|
| Ex. 14 | 90 | 10 | 0.847 | 2 | 256.0 |
| Ex. 15 | 70 | 30 | 0.836 | 8 | 249.1 |

| | $CO_2$ gas permeability constant (*1) | *2 (° C.) | Heat-up crystallization calorific value (J/g) | Density of pellets (kg/m$^3$) |
|---|---|---|---|---|
| Ex. 14 | 7.9 | 226 | 26 | 1370 |
| Ex. 15 | 6.2 | 183 | 25 | 1361 |

*1: cc · mm/m$^2$ · day · atm
*2: $[1/527 - 0.0017 \cdot \ln(1 - (m_I + m_B)/200)]^{-1} - 273$ Example 16

Polyethylene Terephthalate (A-8)

Polyethylene terephthalate (A-8) was prepared in the same manner as in the preparation of the polyethylene terephthalate (A-6), except that to the first reactor were fed 1,322 parts by weight per hour of high-purity terephthalic acid, 150 parts by weight per hour of naphthalenedicarboxylic acid and 591 parts by weight per hour of ethylene glycol. The polyethylene terephthalate (A-8) obtained after the liquid phase polymerization had an intrinsic viscosity ($\eta$), as measured in o-chlorophenol at 25° C., of 0.64 dl/g. The molar ratio between the terephthalic acid and the naphthalenedicarboxylic acid was 92:8.

Blending and Solid Phase Polymerization

Blending was carried out in the same manner as in Example 5, except that the polyethylene terephthalate (A-8) prepared above was used in place of the polyethylene terephthalate (A-5). The resulting pellets were crystallized at 170° C. for 2 hours in a stream of nitrogen and then subjected to solid phase polymerization at 210° C. for 17 hours.

The intrinsic viscosity of the resulting polyester and the acetaldehyde content in the pellets were measured. From the polyester pellets, an oriented film was produced, and the carbon dioxide gas permeability constant of the film was measured. The results are set forth in Table 5.

TABLE 5

|  | A-8 (parts by weight) | B-5 (parts by weight) | Intrinsic viscosity (dl/g) | CH$_3$CHO content (ppm) | Melting point (° C.) |
|---|---|---|---|---|---|
| Ex. 16 | 90 | 10 | 0.866 | 3 | 257.0 |

|  | CO$_2$ gas permeability constant (*1) | *2 (° C.) | Heat-up crystallization calorific value (J/g) | Density of pellets (kg/m$^3$) |
|---|---|---|---|---|
| Ex. 16 | 7.2 | 230 | 26 | 1393 |

*1: cc · mm/m$^2$ · day · atm
*2: [1/527 − 0.0017 · ln(1 − (m$_I$ + m$_B$)/200)]$^{-1}$ − 273

Example 17

Blending

A dry blend of 90 parts by weight of the polyethylene terephthalate (A-5) and 10 parts by weight of the polyethylene isophthalate copolymer (B-5) was melt kneaded by means of a vented twin-screw extruder (TEX-45, manufactured by Nippon Seikosho, L/D=16) under the conditions of a screw rotation number of 400 rpm and a temperature of 280° C. The kneadate was extruded at an extrusion rate of 320 kg/hr to give a strand, and the strand was cut into column-like pellets having a diameter of 2.5 mm and a height of 3.5 mm. The residence time in the extruder was 4.1 seconds.

Solid Phase Polymerization

The pellets obtained above were precrystallized at 170° C. for 2 hours in a stream of nitrogen and then subjected to solid phase polymerization at 210° C. for 14 hours in a nitrogen atmosphere.

The resulting polyester had an intrinsic viscosity of 0.868 dl/g. The acetaldehyde content in the polyester pellets was 2 ppm. The oriented film produced from the polyester pellets had a carbon dioxide gas permeability constant of 9.0 cc·mm/m$^2$·day·atm. The results are set forth in Table 6.

TABLE 6

|  | A-5 (parts by weight) | B-5 (parts by weight) | Solid phase polymerization | | Intrinsic viscosity (dl/g) | CH$_3$CHO content (ppm) |
|---|---|---|---|---|---|---|
|  |  |  | Tem. (° C.) | Time (hr) |  |  |
| Ex. 17 | 90 | 10 | 210 | 14 | 0.868 | 2 |

|  | Melting point (° C.) | *1 (° C.) | Heat-up crystallization calorific value (J/g) | Density of pellets (kg/m$^3$) | CO$_2$ gas permeability constant (*2) |
|---|---|---|---|---|---|
| Ex. 17 | 254.2 | 230 | 26 | 1392 | 9.0 |

*1: [1/527 − 0.0017 · ln(1 − (m$_I$ + m$_B$)/200)]$^{-1}$ − 273
*2: cc · mm/m$^2$ · day · atm Comparative Example 5

Using the polyethylene terephthalate (A-7) without blending it with another polyester, an oriented film was produced. The oriented film had a carbon dioxide gas permeability constant of 16.2 cc·mm/m$^2$·day·atm. The acetaldehyde content in the pellets of the polyethylene terephthalate (A-7) was 2 ppm.

Example 18

Carbonated Beverage Bottle

The polyester resin composition prepared in Example and dried at 160° C. for 4 hours with air having a dew point of −30° C. was molded into a closed-end parison (preform) by means of an injection molding machine M-70B manufactured by Meiki Seisakusho K.K.

The injection molding machine used is equipped with a Dulmage screw having a three-flighted mixing head and having a compression ratio of 1.5. The molding was conducted under the conditions of a molding temperature of 280° C. and a molding cycle of 33 seconds.

The preform was heated by an infrared heater attached to the injection molding machine in such a manner that the surface temperature at the center part of the preform body became 100 to 110° C., and then subjected to biaxial stretching blow molding by means of a molding machine LB-01 manufactured by CORPOPLAST CO., to obtain a carbonated beverage bottle having a capacity of 500 ml. In the biaxial stretching blow molding, the bottle was brought into contact with the mold for 5 seconds at a blow mold temperature of room temperature. Then, the bottle was withdrawn from the mold. The molding cycle was 60 seconds and the plane stretching ratio was 11 times.

From the 500 ml bottle, a portion of the neck part was cut to analyze the acetaldehyde content. Further, the body part of the bottle was cut to evaluate the carbon dioxide gas barrier properties. The results are set forth in Table 7.

Example 19

Carbonated Beverage Bottle

A preform was prepared in the same manner as in Example 18, except that the polyester prepared in Example 10 was used. Then, the preform was subjected to stretching blow molding in the same manner as in Example 18 to obtain a bottle. The acetaldehyde content in the neck part of the bottle and the carbon dioxide gas barrier properties of the body part of the bottle were evaluated in the same manner as in Example 18. The results are set forth in Table 7.

Example 20

Carbonated Beverage Bottle

A preform was prepared in the same manner as in Example 18, except that the polyester prepared in Example 14 was used. Then, the preform was subjected to stretching blow molding in the same manner as in Example 18 to obtain a bottle. The acetaldehyde content in the neck part of the bottle and the carbon dioxide gas barrier properties of the body part of the bottle were evaluated in the same manner as in Example 18. The results are set forth in Table 7.

Example 21

Heat-resistant Bottle

A preform was prepared in the same manner as in Example 18, except that the polyester prepared in Example 10 was used. The neck part of the preform was heated by an infrared heater to crystallize it, and the preform was then subjected to biaxial stretching blow molding by means of a molding machine LB-01 manufactured by CORPOPLAST CO. In the blow molding, the bottle was brought into contact with the mold for 5 seconds at a mold temperature of 130° C., and then air of room temperature was blown into the bottle to cool the bottle. Thereafter, the bottle was withdrawn from the mold. The acetaldehyde content in the neck part of the bottle and the carbon dioxide gas barrier properties of the body part of the bottle were evaluated in the same manner as in Example 18. The results are set forth in Table 7.

Example 22

Evaluation of Film

The polyester prepared in Example 10 was vacuum dried at 150° C. for 16 hours and then molded into a film having a thickness of 0.3 mm by means of a press molding machine at a mold temperature of 290° C. The film was rapidly cooled at a cooling mold temperature of 0° C. to give an amorphous film.

The amorphous film was subjected to simultaneous biaxial orientation (3×3 times) at 90° C. to obtain an oriented film. The film before the orientation was analyzed on the acetaldehyde content, and the film after the orientation was evaluated on the carbon dioxide gas barrier properties. The results are set forth in Table 7.

Example 23

Evaluation of Film

An oriented film was produced in the same manner as in Example 22, except that the polyester prepared in Example 12 was used. The acetaldehyde content in the film before the orientation and the carbon dioxide gas barrier properties of the film after the orientation were evaluated. The results are set forth in Table 7.

Example 24

Evaluation of Unoriented Sheet

The polyester prepared in Example 10 was vacuum dried at 150° C. for 16 hours and then molded into a sheet having a thickness of 0.3 mm by means of an extruder (cylinder diameter: 50 mm, manufactured by Hitachi Shipbuilding & Engineering Co., Ltd.) at a cylinder temperature of 275° C. The acetaldehyde content and the carbon dioxide gas barrier properties of the sheet were evaluated. The results are set forth in Table 7.

TABLE 7

| | | Composition | | | Properties of material | |
|---|---|---|---|---|---|---|
| | Material used | Polyethylene terephthalate prepolymer (parts by weight) | Polyethylene isophthalate prepolymer (parts by weight) | Treatment after blending | Intrinsic viscosity (dl/g) | $CH_3CHO$ content (ppm) |
| Ex. 18 | Ex. 5 | A-5: 90 | B-5: 10 | solid phase polymerization | 0.848 | 2 |
| Ex. 19 | Ex. 10 | A-6: 90 | B-5: 10 | solid phase polymerization | 0.865 | 2 |
| Ex. 20 | Ex. 14 | A-7: 90 | B-5: 10 | crystallization | 0.847 | 2 |
| Ex. 21 | Ex. 10 | A-6: 90 | B-5: 10 | solid phase polymerization | 0.865 | 2 |
| Ex. 22 | Ex. 10 | A-6: 90 | B-5: 10 | solid phase polymerization | 0.865 | 2 |
| Ex. 23 | Ex. 12 | A-6: 50 | B-5: 50 | solid phase polymerization | 0.840 | 2 |
| Ex. 24 | Ex. 10 | A-6: 90 | B-5: 10 | solid phase polymerization | 0.865 | 2 |

| | Properties of molded product | | | | | |
|---|---|---|---|---|---|---|
| | Type | Polyethylene isophthalate prepolymer (% by weight) | $CO_2$ gas permeability constant* (cc · mm/m² · day · atm) | $CH_3CHO$ content (ppm) | Melting point (° C.) | Heat-up crystallization calorific value (J/g) |
| Ex. 18 | carbonated beverage bottle | 10 | 8.8 | 7 | 240 | 24 |
| Ex. 19 | carbonated beverage bottle | 10 | 8.9 | 7 | 241 | 25 |

TABLE 7-continued

| | | | | | | |
|---|---|---|---|---|---|---|
| Ex. 20 | carbonated beverage bottle | 10 | 8.8 | 8 | 240 | 24 |
| Ex. 21 | heat-resistant bottle | 10 | 8.5 | 7 | 240 | 24 |
| Ex. 22 | biaxially oriented film | 10 | 8.7 | 7 | 240 | 23 |
| Ex. 23 | biaxially oriented film | 50 | 6.5 | 10 | 217 | 21 |
| Ex. 24 | sheet (un-oriented) | 10 | 11.3 | 8 | 240 | 24 |

*The carbon dioxide gas permeability constant of the molded product was measured by the use of sections cut from the molded product.

Example 25

Carbonated Beverage Bottle

33 Parts by weight of the polyester resin composition prepared in Example 11 and dried at 160° C. for 4 hours with air having a dew point of −30° C. were dry blended with 67 parts by weight of the polyethylene terephthalate (A-7). Then, the blend was molded into a closed-end parison (preform) by means of an injection molding machine M-70B manufactured by Meiki Seisakusho K.K.

The injection molding machine used is equipped with a Dulmage screw having a three-flighted mixing head and having a compression ratio of 1.5. The molding was conducted under the conditions of a molding temperature of 280° C. and a molding cycle of 33 seconds.

The preform was heated by an infrared heater attached to the injection molding machine in such a manner that the surface temperature at the center part of the preform body became 100 to 110° C., and then subjected to biaxial stretching blow molding by means of a molding machine LB-01 manufactured by CORPOPLAST CO., to obtain a carbonated beverage bottle having a capacity of 500 ml. In the biaxial stretching blow molding, the bottle was brought into contact with the mold for 5 seconds at a blow mold temperature of room temperature. Then, the bottle was withdrawn from the mold. The molding cycle was 60 seconds and the plane stretching ratio was 11 times.

From the 500 ml bottle, a portion of the neck part was cut to analyze the acetaldehyde content. Further, the body part of the bottle was cut to evaluate the carbon dioxide gas barrier properties. The results are set forth in Table 8.

Example 26

Carbonated Beverage Bottle

A preform was prepared in the same manner as in Example 25, except that a dry blend of 33 parts by weight of the polyester prepared in Example 15 and 67 parts by weight of the polyethylene terephthalate (A-7) was used. Then, the preform was subjected to stretching blow molding in the same manner as in Example 25 to obtain a bottle. The acetaldehyde content in the neck part of the bottle and the carbon dioxide gas barrier properties of the body part of the bottle were evaluated in the same manner as in Example 25. The results are set forth in Table 8.

Example 27

Carbonated Beverage Bottle

A preform was prepared in the same manner as in Example 25, except that a dry blend of 20 parts by weight of the polyester prepared in Example 12 and 80 parts by weight of the polyethylene terephthalate (A-7) was used. Then, the preform was subjected to stretching blow molding in the same manner as in Example 25 to obtain a bottle. The acetaldehyde content in the neck part of the bottle and the carbon dioxide gas barrier properties of the body part of the bottle were evaluated in the same manner as in Example 25. The results are set forth in Table 8.

Example 28

Heat-resistant Bottle

A preform was prepared in the same manner as in Example 25, except that a dry blend of 33 parts by weight of the polyester prepared in Example 11 and 67 parts by weight of the polyethylene terephthalate (A-7) was used. The neck part of the preform was heated by an infrared heater to crystallize it, and the preform was then subjected to biaxial stretching blow molding by means of a molding machine LB-01 manufactured by CORPOPLAST CO. In the blow molding, the bottle was brought into contact with the mold for 5 seconds at a mold temperature of 130° C., and then air of room temperature was blown into the bottle to cool the bottle. Thereafter, the bottle was withdrawn from the mold. The acetaldehyde content in the neck part of the bottle and the carbon dioxide gas barrier properties of the body part of the bottle were evaluated in the same manner as in Example 25. The results are set forth in Table 8.

Example 29

Evaluation of Film

33 Parts by weight of the polyester prepared in Example 11 and vacuum dried at 150° C. for 16 hours was blended with 67 parts by weight of the polyethylene terephthalate (A-7). Then, the blend was molded into a film having a thickness of 0.3 mm by means of a press molding machine at a mold temperature of 290° C. The film was rapidly cooled at a cooling mold temperature of 0° C. to give an amorphous film.

The amorphous film was subjected to simultaneous biaxial orientation (3×3 times) at 90° C. to obtain an oriented film. The film before the orientation was analyzed on the acetaldehyde content, and the film after the orientation was evaluated on the carbon dioxide gas barrier properties. The results are set forth in Table 8.

Example 30

Evaluation of Film

An oriented film was produced in the same manner as in Example 29, except that a blend of 40 parts by weight of the polyester prepared in Example 12 and 60 parts by weight of the polyethylene terephthalate (A-7) was used. The acetaldehyde content in the film before the orientation and the carbon dioxide gas barrier properties of the film after the orientation were evaluated. The results are set forth in Table 8.

Example 31

Evaluation of Unoriented Sheet

33 Parts by weight of the polyester prepared in Example 11 and vacuum dried at 150° C. for 16 hours were blended with 67 parts by weight of the polyethylene terephthalate (A-7). Then, the blend was molded into a sheet having a thickness of 0.3 mm by means of an extruder (cylinder diameter: 50 mm, manufactured by Hitachi Shipbuilding & Engineering Co., Ltd.) at a cylinder temperature of 275° C. The acetaldehyde content and the carbon dioxide gas barrier properties of the sheet were evaluated. The results are set forth in Table 8.

TABLE 8

| | | Composition | | | Properties of material | | Material prepared (parts by weight) | Polyethylene terephthalate (A-7) (parts by weight) |
|---|---|---|---|---|---|---|---|---|
| | Material used | Polyethylene terephthalate prepolymer (parts by weight) | Polyethylene isophthalate prepolymer (parts by weight) | Treatment after blending | Intrinsic viscosity (dl/g) | $CH_3CHO$ content (ppm) | | |
| Ex. 25 | Ex. 11 | A-6: 70 | B-5: 30 | solid phase polymerization | 0.833 | 2 | 33 | 67 |
| Ex. 26 | Ex. 15 | A-7: 70 | B-5: 30 | crystallization | 0.836 | 8 | 33 | 67 |
| Ex. 27 | Ex. 12 | A-6: 50 | B-5: 50 | solid phase polymerization | 0.84 | 2 | 20 | 80 |
| Ex. 28 | Ex. 11 | A-6: 70 | B-5: 30 | solid phase polymerization | 0.833 | 2 | 33 | 67 |
| Ex. 29 | Ex. 11 | A-6: 70 | B-5: 30 | solid phase polymerization | 0.833 | 2 | 33 | 67 |
| Ex. 30 | Ex. 12 | A-6: 50 | B-5: 50 | solid phase polymerization | 0.84 | 2 | 40 | 60 |
| Ex. 31 | Ex. 11 | A-6: 70 | B-5: 30 | solid phase polymerization | 0.833 | 2 | 33 | 67 |

| | Properties of molded product | | | | |
|---|---|---|---|---|---|
| | Type | Polyethylene isophthalate prepolymer (% by weight) | $CO_2$ gas permeability constant* (cc · mm/m² · day · atm) | $CH_3CHO$ content in molded product (ppm) | Melting point (° C.) | Heat-up crystallization calorific value (J/g) |
| Ex. 25 | carbonated beverage bottle | 10 | 8.6 | 7 | 240 | 24 |
| Ex. 26 | carbonated beverage bottle | 10 | 8.6 | 7 | 240 | 24 |
| Ex. 27 | carbonated beverage bottle | 10 | 8.5 | 7 | 239 | 24 |
| Ex. 28 | heat- | 10 | 8.5 | 6 | 240 | 23 |

TABLE 8-continued

| | | | | | | |
|---|---|---|---|---|---|---|
| | resistant bottle | | | | | |
| Ex. 29 | biaxially oriented film | 10 | 8.7 | 8 | 240 | 23 |
| Ex. 30 | biaxially oriented film | 20 | 6.5 | 7 | 235 | 20 |
| Ex. 31 | sheet (un-oriented) | 10 | 11.3 | 7 | 240 | 24 |

*The carbon dioxide gas permeability constant of the molded product was measured by the use of sections cut from the molded product.

Example 32

Evaluation of Laminated Bottle

Using the polyester prepared in Example 11 and vacuum dried at 150° C. for 16 hours as a material of an intermediate layer and using the polyethylene terephthalate (A-7) as a material of inner and outer layers, a preform (total thickness of inner and outer layers/thickness of intermediate layer= 67/33) was prepared by means of an injection blow molding machine ASB-50HT (cylinder temperature for intermediate layer: 210° C., cylinder temperature for inner and outer layers: 270° C., manufactured by Nissei ASB Machine K.K.). Then, the preform was subjected to stretching blow molding to produce a laminated bottle having a capacity of 500 ml. From the laminated bottle, a portion of the neck part was cut to analyze the acetaldehyde content. Further, the body part of the bottle was cut to evaluate the carbon dioxide gas barrier properties. The results are set forth in Table 9.

Example 33

A laminated bottle was produced in the same manner as in Example 32, except that the polyester obtained in Example 15 was used as a material of the intermediate layer. The acetaldehyde content and the carbon dioxide gas barrier properties of the bottle were evaluated. The results are set forth in Table 9.

Example 34

A laminated bottle was produced in the same manner as in Example 32, except that the polyester obtained in Example 12 was used as a material of the intermediate layer and the ratio between the thickness of the polyester intermediate layer and the total thickness of the polyethylene terephthalate (A-7) inner and outer layers was varied as shown in Table 9. The acetaldehyde content and the carbon dioxide gas barrier properties of the bottle were evaluated. The results are set forth in Table 9.

Example 35

A preform was prepared in the same manner as in Example 32. The neck part of the preform was crystallized in the same manner as in Example 21, and the preform was then subjected to blow molding in the same manner as in Example 21. The results are set forth in Table 9.

Example 36

Using the polyester prepared in Example 11 and vacuum dried at 150° C. for 16 hours as a material of an intermediate layer and using the polyethylene terephthalate (A-7) vacuum dried at 150° C. for 16 hours as a material of inner and outer layers, a laminated sheet having a thickness of 0.3 mm was produced by means of a co-extruder manufactured by Hitachi Shipbuilding & Engineering Co., Ltd. Then, the laminated sheet was subjected to biaxial orientation (3×3 times) at 90° C. to obtain an oriented film. The acetaldehyde content in the laminated film before the orientation and the carbon dioxide gas barrier properties of the laminated film after the orientation were evaluated. The results are set forth in Table 9.

Example 37

A laminated film was produced in the same manner as in Example 36, except that the polyester prepared in Example 12 was used as a material of the intermediate layer and the ratio between the thickness of the polyester intermediate layer and the total thickness of the polyethylene terephthalate (A-7) inner and outer layers was 40:60. The acetaldehyde content in the laminated film before the orientation and the carbon dioxide gas barrier properties of the laminated film after the orientation were evaluated. The results are et forth in Table 9.

Example 38

A laminated bottle was produced in the same manner as in Example 32, except that a naphthalenedicarboxylic acid copolymer which had naphthalenedicarboxylic acid:terephthalic acid=8:92 and a molar ratio of ethylene glycol: diethylene glycol=97:3, and had an intrinsic viscosity: 0.85 dl/g and an acetaldehyde content of 2 ppm, was used as a material of the inner and outer layers in place of the polyethylene terephthalate (A-7). From the laminated bottle, a portion of the neck part was cut to analyze the acetaldehyde content. Further, the carbon dioxide gas barrier properties of the laminated bottle part was evaluated in the same manner as in Example 32. The results are set forth in Table 9.

Example 39

Using the polyester prepared in Example 11 and vacuum dried at 150° C. for 16 hours as a material of an intermediate layer and using the polyethylene terephthalate (A-7) vacuum dried at 150° C. for 16 hours as a material of inner and outer layers, a laminated sheet having a thickness of 0.3 mm was produced by means of a co-extruder manufactured by Hitachi Shipbuilding & Engineering Co., Ltd. The acetaldehyde content and the carbon dioxide gas barrier properties of the laminated sheet were evaluated. The results are set forth in Table 9.

TABLE 9

| | Laminate molding | | | | | |
|---|---|---|---|---|---|---|
| | Composition of intermediate layer-forming material | | | | Properties of material | |
| | Material used | Polyethylene terephthalate prepolymer (parts by weight) | Polyethylene isophthalate prepolymer (parts by weight) | Treatment after blending | Intrinsic viscosity (dl/g) | $CH_3CHO$ content (ppm) |
| Ex. 32 | Ex. 11 | A-6: 70 | B-5: 30 | solid phase polymerization | 0.833 | 2 |
| Ex. 33 | Ex. 15 | A-7: 70 | B-5: 30 | crystallization | 0.836 | 8 |
| Ex. 34 | Ex. 12 | A-6: 50 | B-5: 50 | solid phase polymerization | 0.84 | 2 |
| Ex. 35 | Ex. 11 | A-6: 70 | B-5: 30 | solid phase polymerization | 0.833 | 2 |
| Ex. 36 | Ex. 11 | A-6: 70 | B-5: 30 | solid phase polymerization | 0.833 | 2 |
| Ex. 37 | Ex. 12 | A-6: 50 | B-5: 50 | solid phase polymerization | 0.84 | 2 |
| Ex. 38 | Ex. 11 | A-6: 70 | B-5: 30 | solid phase polymerization | 0.833 | 2 |
| Ex. 39 | Ex. 11 | A-6: 70 | B-5: 30 | solid phase polymerization | 0.833 | 2 |

| | Thickness ratio | | Properties of molded product | | | |
|---|---|---|---|---|---|---|
| | Thickness of material layer (%) | Thickness of polyethylene terephthalate (A-7) layer (%) | Type | Polyethylene isophthalate prepolymer (% by weight) | $CO_2$ gas permeability constant* (cc · mm/m² · day · atm) | $CH_3CHO$ content (ppm) |
| Ex. 32 | 33 | 67 | carbonated beverage bottle | 10 | 8 | 7 |
| Ex. 33 | 33 | 67 | carbonated beverage bottle | 10 | 8 | 7 |
| Ex. 34 | 20 | 80 | carbonated beverage bottle | 10 | 7.8 | 7 |
| Ex. 35 | 33 | 67 | heat-resistant bottle | 10 | 8 | 6 |
| Ex. 36 | 33 | 67 | biaxially oriented film | 10 | 7.9 | 8 |
| Ex. 37 | 40 | 67 | biaxially oriented film | 20 | 5.7 | 8 |
| Ex. 38 | 33 | 67** | carbonated beverage bottle | 10 | 7.4 | 7 |
| Ex. 39 | 33 | 67 | sheet (unoriented) | 10 | 10.5 | 8 |

*The carbon dioxide gas permeability constant of the molded product was measured by the use of sections cut from the molded product.
**A copolyester (IV = 0.85 dl/g, acetaldehyde content = 2 ppm, naphthalenedicarboxylic acid/terephthalic acid = 8/92 by mol, ethylene glycol/diethylene glycol = 97/3 by mol) was used in place of A-7.

Comparative Example 6

90 Parts by weight of the polyethylene terephthalate (A-7), 10 parts by weight of the polyethylene isophthalate copolymer (B-5) and 150 ppm of magnesium stearate were dry blended. Then, the blend was molded into a bottle in the same manner as in Example 18. The acetaldehyde content and the carbon dioxide gas barrier properties of the bottle were evaluated. The results are set forth in Table 10.

Comparative Example 7

80 Parts by weight of the polyethylene terephthalate (A-7), 20 parts by weight of the polyethylene isophthalate copolymer (B-5) and 150 ppm of magnesium stearate were dry blended. Then, the blend was molded into a bottle in the same manner as in Example 18. The acetaldehyde content and the carbon dioxide gas barrier properties of the bottle were evaluated. The results are set forth in Table 10.

Comparative Example 8

Using the polyethylene terephthalate (A-7) as a material of inner and outer layers and using the polyethylene isophthalate copolymer (B-5) as a material of an intermediate layer, a laminated bottle was produced in the same manner as in Example 32. The cetaldehyde content and the carbon dioxide gas barrier properties of the bottle were evaluated. The results re set forth in Table 10.

Comparative Example 9

Using a naphthalenedicarboxylic acid copolymer which had a molar ratio of naphthalenedicarboxylic acid:terephthalic acid=8:92 and a molar ratio of ethylene glycol: diethylene glycol=97:3, and had an intrinsic viscosity of 0.85 dl/g and an acetaldehyde content of 2 ppm, as a material of inner and outer layers and using the polyethylene isophthalate copolymer (B-5) as a material of an intermediate layer, a laminated bottle was produced in the same manner as in Example 32. The acetaldehyde content and the carbon dioxide gas barrier properties of the bottle were evaluated. The results are set forth in Table 10.

TABLE 10

| | Polyethylene terephthalate prepolymer (A-7) (parts by weight) | Polyethylene isophthalate prepolymer (B-5) (parts by weight) | Type of molded product | Molding method | $CO_2$ gas permeability constant (cc · mm/m$^2$ · day · atm) | $CH_3CHO$ content (ppm) |
|---|---|---|---|---|---|---|
| Comp. Ex. 6 | 90 | 10 | Carbonated beverage bottle | blending* | 8.9 | 11 |
| Comp. Ex. 7 | 80 | 20 | Carbonated beverage bottle | blending* | 6.3 | 13 |
| Comp. Ex. 8 | 90 | 10 | Carbonated beverage bottle | multi-layer | 8 | 10 |
| Comp. Ex. 9 | 90** | 10 | Carbonated beverage bottle | multi-layer | 7.3 | 10 |

*Magnesium stearate was externally added in an amount of 150 ppm based on the total amount (100 parts by weight) of the resins.
**A copolyester (IV = 0.85 dl/g, acetaldehyde content = 2 ppm, naphthalenedicarboxylic acid/ terephthalic acid = 8/92 by mol, ethylene glycol/diethylene glycol = 97/3 by mol) was used in place of A-7.

What is claimed is:

1. Polyester pellets made of a polyester which comprises dicarboxylic acid constituent units derived from dicarboxylic acids containing terephthalic acid and isophthalic acid and diol constituent units derived from diols containing ethylene glycol and 1,3-bis(2-hydroxyethoxy)benzene, and which has the following properties:

constituent units derived from terephthalic acid are 50 to 99% by mol and constituent units derived from isophthalic acid are 1 to 50% by mol, both based on the total amount of dicarboxylic acid constituent units (i), constituent units derived from ethylene glycol are 25 to 99.5% by mol and constituent units derived from 1,3-bis(2-hydroxyethoxy)benzene 0.5 to 75% by mol, both based on the total amount of diol constituent units (ii), the intrinsic viscosity is in the range of 0.5 to 1.5 dl/g, and the melting point (Tm (° C.)), as measured by a differential scanning calorimeter, satisfies the following formula (I):

$$[1/527-0.0017\cdot\ln(1-(m_I+m_B)/200)]^{-1}-273 < Tm \leq 265 \quad (I)$$

wherein $m_I$ is a proportion (% by mol) of the constituent units derived from isophthalic acid to all of the dicarboxylic acid constituent units, and $m_B$ is a proportion (% by mol) of the constituent units derived from 1,3-bis(2-hydroxyethoxy) benzene to all of the diol constituent units;

said polyester pellets having a density of not less than 1,350 kg/m$^3$.

2. The polyester pellets as claimed in claim 1, wherein the melting point (Tm (° C.)) satisfies the following formula (I'):

$$[1/527-0.0017\cdot\ln(1-(m_I+m_B)/200)]^{-1}-270 < Tm \leq 265 \quad (I').$$

3. The polyester pellets as claimed in claim 1 or claim 2, having an acetaldehyde content of not more than 20 ppm.

4. The polyester pellets as claimed in claim 3, wherein the acetaldehyde content is not more than 10 ppm.

5. Polyester pellets prepared from a composition comprising (A) 98 to 50% by weight of a polyethylene terephthalate copolymer derived from terephthalic acid and diol comprising ethylene glycol and having an intrinsic viscosity of 0.3 to 0.8 dl/g before solid phase polymerization, and (B) 2 to 50% by weight of polyethylene isophthalate copolymer derived from isophthalic acid and terephthalic acid and diol comprising ethylene glycol and 1,3-bis(2-hydroxyethoxy)-benzene, wherein the isophthalic acid is in an amount of 50–98 wt % and the terephthalic acid is in an amount of 2 to 50% by weight and having an intrinsic viscosity of 0.3 to 0.9 dl/g before solid phase polymerization, and subjecting the blend to solid phase polymerization.

6. The polyester pellets of claim 5, wherein in the copolymer (B) the ethylene glycol comprises 12 to 80% by mol and the 1,3-bis(2-hydroxyethoxy) benzene comprises 20 to 88% by mole of the amount of the diol.

7. The polyester pellets of the claim 5 or 6 wherein the copolymer (A) prior to blending with the copolymer (B) has been subjected to solid phase polymerization.

* * * * *